(12) United States Patent
Li et al.

(10) Patent No.: US 12,347,141 B2
(45) Date of Patent: Jul. 1, 2025

(54) METHOD AND APPARATUS WITH OBJECT POSE ESTIMATION

(71) Applicant: Samsung Electronics Co., Ltd., Suwon-si (KR)

(72) Inventors: Weiming Li, Beijing (CN); Jiyeon Kim, Hwaseong-si (KR); Hyun Sung Chang, Seoul (KR); Qiang Wang, Beijing (CN); Sunghoon Hong, Hwaseong-si (KR); Yang Liu, Beijing (CN); Yueying Kao, Beijing (CN); Hao Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 840 days.

(21) Appl. No.: 17/537,729

(22) Filed: Nov. 30, 2021

(65) Prior Publication Data

US 2022/0198707 A1 Jun. 23, 2022

(30) Foreign Application Priority Data

Dec. 18, 2020 (CN) .......................... 202011503824.2
Aug. 19, 2021 (KR) ........................ 10-2021-0109275

(51) Int. Cl.
*G06T 7/73* (2017.01)
*G06T 7/11* (2017.01)
*G06T 7/50* (2017.01)

(52) U.S. Cl.
CPC .................. *G06T 7/75* (2017.01); *G06T 7/11* (2017.01); *G06T 7/50* (2017.01); *G06T 2207/10028* (2013.01); *G06T 2207/20081* (2013.01); *G06T 2207/20084* (2013.01)

(58) Field of Classification Search
CPC ..... G06T 7/75; G06T 7/11; G06T 7/50; G06T 2207/10028; G06T 2207/20081; G06T 2207/20084; G06T 2207/10024; G06T 2207/20016; G06T 7/73
See application file for complete search history.

(56) References Cited

U.S. PATENT DOCUMENTS

| | | | |
|---|---|---|---|
| 10,402,978 | B1 | 9/2019 | Kim et al. |
| 12,026,892 | B2 * | 7/2024 | Brown ................ G06V 10/774 |
| 2014/0145936 | A1 | 5/2014 | Gu et al. |
| 2018/0330504 | A1 | 11/2018 | Karlinsky et al. |
| 2019/0096135 | A1 * | 3/2019 | Dal Mutto ........ G06F 18/24765 |
| 2019/0138849 | A1 | 5/2019 | Zhang |
| 2019/0303648 | A1 | 10/2019 | Zhai et al. |
| 2019/0385026 | A1 | 12/2019 | Richeimer et al. |
| 2020/0089997 | A1 | 3/2020 | Chaubard |

(Continued)

FOREIGN PATENT DOCUMENTS

| | | |
|---|---|---|
| JP | 2015-156128 A | 8/2015 |
| WO | WO 2020/154967 A1 | 8/2020 |

*Primary Examiner* — Pinalben Patel
(74) *Attorney, Agent, or Firm* — NSIP Law

(57) ABSTRACT

A method with object pose estimation includes: obtaining an instance segmentation image and a normalized object coordinate space (NOCS) map by processing an input single-frame image using a deep neural network (DNN); obtaining a two-dimensional and three-dimensional (2D-3D) mapping relationship based on the instance segmentation image and the NOCS map; and determining a pose of an object instance in the input single-frame image based on the 2D-3D mapping relationship.

20 Claims, 14 Drawing Sheets

(56) References Cited

U.S. PATENT DOCUMENTS

| | | |
|---|---|---|
| 2020/0134365 A1 | 4/2020 | Liu et al. |
| 2020/0242739 A1* | 7/2020 | Laine .................... G06N 7/01 |
| 2022/0222889 A1* | 7/2022 | Bhargava .............. G06T 19/20 |
| 2024/0153251 A1* | 5/2024 | Zhuang .................. G06T 7/70 |
| 2024/0320843 A1* | 9/2024 | Kollar .................... G06T 7/70 |

* cited by examiner

METHOD AND APPARATUS WITH OBJECT POSE ESTIMATION

CROSS-REFERENCE TO RELATED APPLICATIONS

This application claims the benefit under 35 USC § 119(a) of Chinese Patent Application No. 202011503824.2 filed on Dec. 18, 2020 in the China National Intellectual Property Administration, and Korean Patent Application No. 10-2021-0109275 filed on Aug. 19, 2021 in the Korean Intellectual Property Office, the entire disclosures of which are incorporated herein by reference for all purposes.

BACKGROUND

1. Field

The following description relates to a method and apparatus for estimating a pose of an object. For example, the following description relates to a method and apparatus for estimating a pose of an object based on a single-stage deep neural network (DNN).

2. Description of Related Art

Augmented reality (AR) technology may provide a user with an experience of real information by adding a virtual content to a real scene appearing before the user. The AR technology may need highly accurate real-time processing and interpretation of a three-dimensional (3D) state of a nearby object to provide a high-quality virtual and real world fusion effect to the user in a 3D space.

To construct an object instance more accurately in a 3D space, a six degrees of freedom (6DoF) pose and size of the object instance may need to be accurately estimated in real time.

A method of estimating a 6DoF pose and size of an unseen object based on an initial red, green, blue (RGB)-depth (RGB-D) image may estimate a 6DoF pose and size of the object using a pose fitting method based on a depth image and an output of a deep network that is based on a mask region-based convolutional neural network (R-CNN) framework. However, this method may use a two-stage network structure to predict an object-level normalized object coordinate space (NOCS) map, and may thus be slow in execution speed and may not readily satisfy a real-time requirement. In addition, the method may depend on an RGB-D image input, and thus may not readily estimate a pose and a size of an object instance when depth data is omitted or there is noise.

In contrast, another method of estimating a 6DoF pose of an unseen object that is executable in real time in a mobile device may use two depth network models that are familiar to the mobile device. However, this method may use only a single-frame RGB image due to design principles, and may not estimate a size of an unknown object but estimate only a pose of an object in terms of scale.

Although these foregoing methods may be provided to solve an issue in instance-level object pose estimation, the methods may need to acquire a textureless computer-aided design (CAD) model of an object, and depend on a result of a two-dimensional (2D) detection model. Thus, the methods may not satisfy real-time requirements in the applications of AR technology.

Thus, there is a desire for a technology for accurately estimating a pose of an unseen object in real time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with object pose estimation includes: obtaining an instance segmentation image and a normalized object coordinate space (NOCS) map by processing an input single-frame image using a deep neural network (DNN); obtaining a two-dimensional and three-dimensional (2D-3D) mapping relationship based on the instance segmentation image and the NOCS map; and determining a pose of an object instance in the input single-frame image based on the 2D-3D mapping relationship.

The method may further include: obtaining a pixel coordinate error map by processing the input single-frame image using the DNN. The obtaining of the 2D-3D mapping relationship may include: constructing a preliminary 2D-3D mapping relationship of the object instance by obtaining a pixel point in the object instance in the input single-frame image and a NOCS point of the pixel point using the instance segmentation image and the NOCS map; and obtaining the 2D-3D mapping relationship by removing abnormal 2D-3D mapping from the preliminary 2D-3D mapping relationship using the pixel coordinate error map.

Each error value among error values of the pixel coordinate error map may represent a difference between a predicted NOCS coordinate value and a real NOCS coordinate value for each pixel point among pixel points of the input single-frame image.

The obtaining of the 2D-3D mapping relationship by removing the abnormal 2D-3D mapping from the preliminary 2D-3D mapping relationship using the pixel coordinate error map may include: determining an error value greater than a preset threshold value in the pixel coordinate error map; and obtaining the 2D-3D mapping relationship by removing, from the preliminary 2D-3D mapping relationship, 2D-3D mapping corresponding to a NOCS point corresponding to the error value greater than the preset threshold value.

The processing of the input single-frame image using the DNN may include obtaining a multi-scale image feature by extracting a feature from the input single-frame image using a feature extraction module of the DNN.

The obtaining of the NOCS map may include: obtaining a single-scale image feature by fusing the multi-scale image feature using a multi-level feature fusion module of the DNN; and obtaining the NOCS map by performing a convolution on the single-scale image feature using a first convolution module of the DNN.

The obtaining of the pixel coordinate error map by processing the input single-frame image using the DNN may include obtaining the pixel coordinate error map by performing a convolution on the single-scale image feature using the first convolution module.

The obtaining of the instance segmentation image may include: obtaining a mask feature image by performing a convolution on the single-scale image feature using a second convolution module of the DNN; obtaining an object category image and a mask convolution weight for each of multiple scales through a convolution corresponding to each of multi-scale image features using a third convolution module of the DNN; obtaining a multi-scale instance mask image by performing a convolution on the mask feature image and a multi-scale mask convolution weight; and obtaining the instance segmentation image using the multi-scale instance mask image and a multi-scale object category image.

The determining of the pose of the object instance in the input single-frame image based on the 2D-3D mapping relationship may include: in the presence of a depth image corresponding to the input single-frame image, determining a (three-dimensional and three-dimensional) 3D-3D mapping relationship based on the 2D-3D mapping relationship and the depth image, and determining the pose and a size of the object instance using the 3D-3D mapping relationship.

The determining of the pose of the object instance in the input single-frame image based on the 2D-3D mapping relationship may include: in the absence of a depth image corresponding to the input single-frame image, determining a three-dimensional (3D) rotation transformation and a 3D translation transformation between a camera coordinate system and an object coordinate system using the 2D-3D mapping relationship, and determining the pose of the object instance in a preset size.

In another general aspect, a method with object pose estimation includes: obtaining an instance segmentation image and a two-dimensional and three-dimensional (2D-3D) mapping relationship of each of frame images, using a deep neural network (DNN); calculating a camera motion parameter between two frame images among the frame images; determining a three-dimensional and three-dimensional (3D-3D) mapping relationship of a same object instance in the two frame images based on the camera motion parameter, the instance segmentation image, and the 2D-3D mapping relationship that correspond to the two frame images; and determining a pose and a size of the same object instance using the 3D-3D mapping relationship.

The obtaining of the instance segmentation image and the 2D-3D mapping relationship of each of the frame images using the DNN may include: obtaining the instance segmentation image and a normalized object coordinate space (NOCS) map by processing each of the frame images using the DNN; and obtaining the 2D-3D mapping relationship of each of the frame images based on the instance segmentation image and the NOCS map of each of the frame images.

The method may further include: obtaining a pixel coordinate error map by processing each of the frame images using the DNN. The obtaining of the 2D-3D mapping relationship of each of the frame images may include: constructing a preliminary 2D-3D mapping relationship of the same object instance by obtaining a pixel point in the same object instance in each of the frame images and a NOCS point of the pixel point using the NOCS map and the instance segmentation image; and obtaining the 2D-3D mapping relationship by removing abnormal 2D-3D mapping from the preliminary 2D-3D mapping relationship using the pixel coordinate error map.

The determining of the 3D-3D mapping relationship of the same object instance in the two frame images based on the camera motion parameter, the instance segmentation image, and the 2D-3D mapping relationship that correspond to the two frame images may include: determining a corresponding relationship between pixels in the same object instance in the two frame images based on the instance segmentation image and the 2D-3D mapping relationship; obtaining three-dimensional (3D) coordinates by calculating a depth of a pixel point in the same object instance in a real scene, using the corresponding relationship between the pixels in the same object instance and the camera motion parameter; and constructing the 3D-3D mapping relationship based on the 3D coordinates of the pixel point in the same object instance in the real scene and on the 2D-3D mapping relationship.

In another general aspect, an apparatus with object pose estimation includes: an image processor configured to obtain an instance segmentation image and a normalized object coordinate space (NOCS) map by processing an input single-frame image using a deep neural network (DNN); a mapping relationship determiner configured to obtain a two-dimensional and three-dimensional (2D-3D) mapping relationship based on the instance segmentation image and the NOCS map; and a pose determiner configured to determine a pose of an object instance in the input single-frame image based on the 2D-3D mapping relationship.

The image processor may be further configured to obtain a pixel coordinate error map by processing the input single-frame image using the DNN. The mapping relationship determiner may be further configured to obtain the 2D-3D mapping relationship by constructing a preliminary 2D-3D mapping relationship of the object instance by obtaining a pixel point in the object instance in the input single-frame image using the instance segmentation image and the NOCS map, and by removing abnormal 2D-3D mapping from the preliminary 2D-3D mapping relationship using the pixel coordinate error map.

The mapping relationship determiner may be further configured to obtain the 2D-3D mapping relationship by determining an error value greater than a preset threshold value in the pixel coordinate error map, and by removing, from the preliminary 2D-3D mapping relationship, 2D-3D mapping corresponding to a NOCS point corresponding to the error value greater than the preset threshold value.

The pose determiner may be further configured to: in the presence of a depth image corresponding to the input single-frame image, determine a three-dimensional and three-dimensional (3D-3D) mapping relationship based on the 2D-3D mapping relationship and the depth image, and determine a pose and a size of the object instance using the 3D-3D mapping relationship; and in the absence of the depth image corresponding to the input single-frame image, determine a 3D rotation transformation and a 3D translation transformation between a camera coordinate system and an object coordinate system using the 2D-3D mapping relationship, and determine a pose of the object instance in a preset size.

In another general aspect, an apparatus with object pose estimation includes: an image processor and mapper configured to obtain an instance segmentation image and a two-dimensional and three-dimensional (2D-3D) mapping relationship of each of frame images, using a deep neural network (DNN); a camera motion determiner configured to calculate a camera motion parameter between two frame images among the frame images; a corresponding relationship constructor configured to determine a three-dimensional and three-dimensional (3D-3D) mapping relationship of a same object instance in the two frame images based on the camera motion parameter, the instance segmentation image, and the 2D-3D mapping relationship that correspond to the two frame images; and a pose determiner configured to determine a pose and a size of the same object instance using the 3D-3D mapping relationship.

The corresponding relationship constructor may be further configured to: determine a corresponding relationship between pixels in the same object instance in the two frame images based on the instance segmentation image and the 2D-3D mapping relationship; obtain three-dimensional (3D) coordinates by calculating a depth of a pixel point in the same object instance in a real scene, using the corresponding relationship between the pixels in the same object instance and the camera motion parameter; and construct the 3D-3D mapping relationship based on the 3D coordinates of the pixel point in the same object instance in the real scene and on the 2D-3D mapping relationship.

Other features and aspects will be apparent from the following detailed description, the drawings, and the claims.

Figure 1:
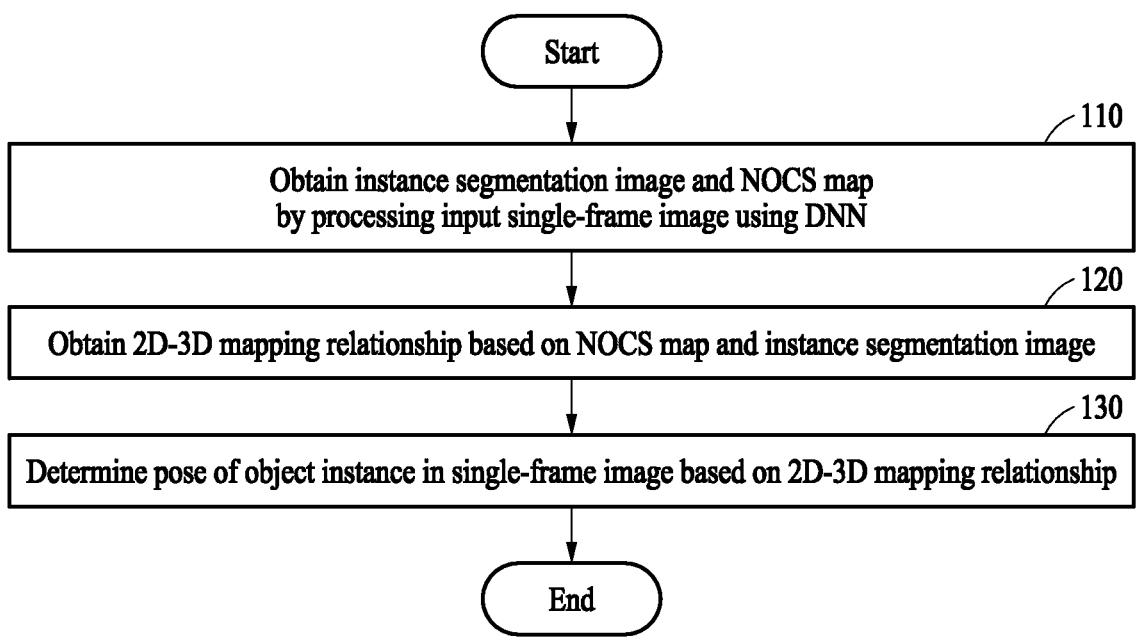
FIG. 1 illustrates an example of an object pose estimating method performed by an object pose estimating apparatus.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, example embodiments of a method and apparatus for estimating a pose of an object (also simply referred to herein as an object pose estimating method and apparatus) will be described with reference to FIGS. 1 through 13.

FIG. 1 illustrates an example of an object pose estimating method performed by an object pose estimating apparatus.

Referring to FIG. 1, in operation 110, the object pose estimating apparatus may obtain an instance segmentation image and a normalized object coordinate space (NOCS) map by processing an input single-frame image using a single-stage deep neural network (DNN). The input single-frame image may be a color image (e.g., a red, green, blue (RGB) image) or a gray image. Operation 110 will be described in more detail with reference to FIG. 2.

In operation 120, the object pose estimating apparatus may obtain a two-dimensional and three-dimensional (2D-3D) mapping relationship based on the instance segmentation image and the NOCS map.

For example, the object pose estimating apparatus may obtain two-dimensional (2D) coordinates of a pixel point in an object instance belonging to a certain category in the single-frame image through the instance segmentation image, and obtain three-dimensional (3D) coordinates of a NOCS point corresponding to the pixel point in the single-frame image through the NOCS map. The object pose estimating apparatus may then construct a 2D-3D mapping relationship of the pixel point based on the obtained 2D coordinates of the pixel point and the obtained 3D coordinates of the NOCS point corresponding to the pixel point.

In operation 130, the object pose estimating apparatus may determine a pose of the object instance in the single-frame image based on the 2D-3D mapping relationship. Operation 130 will be described in more detail with reference to FIG. 3.

Figure 2:
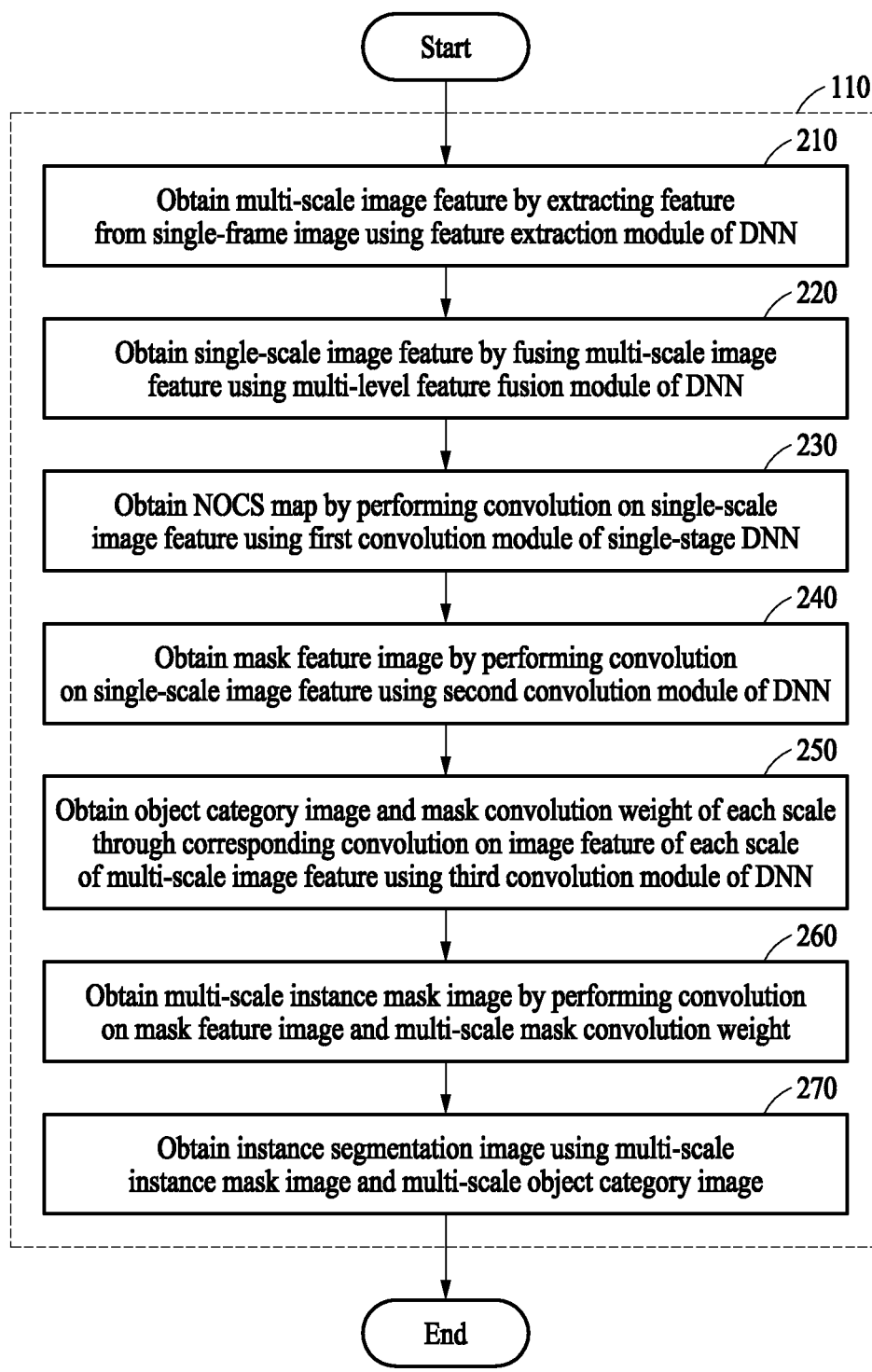
FIG. 2 illustrates an example of a method of processing an input single-frame image using a deep neural network (DNN) by an object pose estimating apparatus to obtain an instance segmentation image and a normalized object coordinate space (NOCS) map.

FIG. 2 illustrates an example of a method of processing an input single-frame image using a DNN by an object pose estimating apparatus to obtain an instance segmentation image and a NOCS map.

The example of FIG. 2 will be described hereinafter in conjunction with examples of FIGS. 4A and 4B. FIGS. 4A and 4B illustrate examples of a method (corresponding to a method of FIG. 3) of estimating a pose of an object instance performed by an object pose estimating apparatus.

Referring to FIG. 2, in operation 210, the object pose estimating apparatus may obtain a multi-scale image feature by extracting a feature from a single-frame image 401 using a feature extraction module 411 of a single-stage DNN. For example, as illustrated in FIGS. 4A and 4B, the multi-scale image feature (or image feature of multiple scales) of the single-frame image 401 may be obtained by inputting the single-frame image 401 to the feature extraction model 411 (e.g., an image convolution network) of the single-stage DNN.

Referring again to FIG. 2, in operation 220, the object pose estimating apparatus may obtain a single-scale image feature by fusing the multi-scale image feature using a multi-level fusion module 412 of the single-stage DNN. For example, as illustrated in FIGS. 4A and 4B, a fused single-scale image feature (or a fused image feature of a single scale) may be obtained by inputting the multi-scale image feature output from the feature extraction module 411 (or the image convolution network) to the multi-level feature fusion module 412, and then by fusing the input multi-scale image feature through the multi-level feature fusion module 412. For example, the image features of the multiple scales may be sampled into the same single scale through upsampling, and then the fused image feature of the same scale may be output through feature splicing and convolution.

Referring to FIG. 2, in operation 230, the object pose estimating apparatus may obtain a NOCS map 414 by performing a convolution on the single-scale image feature using a first convolution module 413 of the single-stage DNN. For example, as illustrated in FIGS. 4A and 4B, the NOCS map 414 may be obtained by inputting the fused single-scale image feature output from the multi-level feature fusion module 412 of the single-stage DNN to the first convolution module 413 (e.g., a convolution structure) and performing a convolution on the input single-scale image feature. In this example, three channels of each pixel in the NOCS map 414 may represent 3D coordinates of a NOCS point corresponding to a position of each pixel. The NOCS map 414 may be used to predict a NOCS point corresponding to a pixel point in each object instance of an input scene.

As shown in FIG. 2, in operation 240, the object pose estimating apparatus may obtain a mask feature image 416 by performing a convolution on the single-scale image feature using a second convolution module 415 of the single-stage DNN. For example, as illustrated in FIGS. 4A and 4B, the mask feature image 416 may be extracted by inputting, also to the second convolution module 415 of the single-stage DNN, the fused single-scale image feature output from the multi-level feature fusion module 412 of the single-stage DNN and performing a convolution on the input single-scale image feature.

Referring again to FIG. 2, in operation 250, the object pose estimating apparatus may obtain an object category image 418 and a mask convolution weight 419 of each scale by performing a corresponding convolution on an image feature of each scale of the multi-scale image feature using a third convolution module 417 of the single-stage DNN. For example, as illustrated in FIGS. 4A and 4B, the multi-scale image feature output from the feature extraction module 411 of the single-stage DNN may be input to the third convolution module 417 to be convoluted therein. An image feature of each scale among the image features of the multiple scales may be input to a corresponding convolution structure of the third convolution module 417 having a plurality of convolution structures. Thus, the object category image 418 of each scale may be generated, and the mask convolution weight 419 may be obtained by masking a convolution weight. An object category image used herein may represent each of categories of object instances at different positions in an input single-frame image. For example, when the input single-frame image includes a table and a tree, an object category image generated from the single-frame image may represent each of object instances at positions corresponding to the table in the category of table and to the tree in the category of tree.

As shown in FIG. 2, in operation 260, the object pose estimating apparatus may obtain a multi-scale instance mask image 420 by performing a convolution on the mask feature image 416 and the multi-scale mask convolution weight 419. For example, as illustrated in FIGS. 4A and 4B, the object pose estimating apparatus may generate the multi-scale instance mask image 420 by convoluting the mask feature image 416 output from the second convolution module 415 of the single-stage DNN and a mask convolution weight of each scale of the multi-scale mask convolution weight 419 output from the third convolution module 417 of the single-stage DNN. An instance mask image used herein may represent an image region belonging to a certain object instance in a single-frame image. That is, the instance mask image may represent only the image region corresponding to the object instance, but not represent a category of the object instance. For example, an instance mask image may only represent an image region of an object instance corresponding to a table, but not indicate that the object instance belongs to the category of table.

Referring to FIG. 2, in operation 270, the object pose estimating apparatus may obtain an instance segmentation image 422 using the multi-scale instance mask image 420 and the multi-scale object category image 418. For example, as illustrated in FIGS. 4A and 4B, the object pose estimating apparatus may obtain the instance segmentation image 422 by indexing the multi-scale instance mask image 420 and the multi-scale object category image 418. An instance segmentation image used herein may represent an image region of an object instance in a certain category that is at a different position in an input single-frame image. That is, the instance segmentation image may represent a category of object instances at different positions in the single-frame image, and also represent an image region of the object instances at the different positions in the single-frame image.

As described above, the object pose estimating apparatus may obtain the instance segmentation image 422 and the NOCS map 414. Although FIG. 2 illustrates an example where the NOCS map 414 is obtained in operation 230 after operations 210 and 220, and then the instance segmentation image 422 is obtained, the disclosure is not limited to this example. For example, operation 230 may be performed after one of operations 240 through 270.

Figure 3:
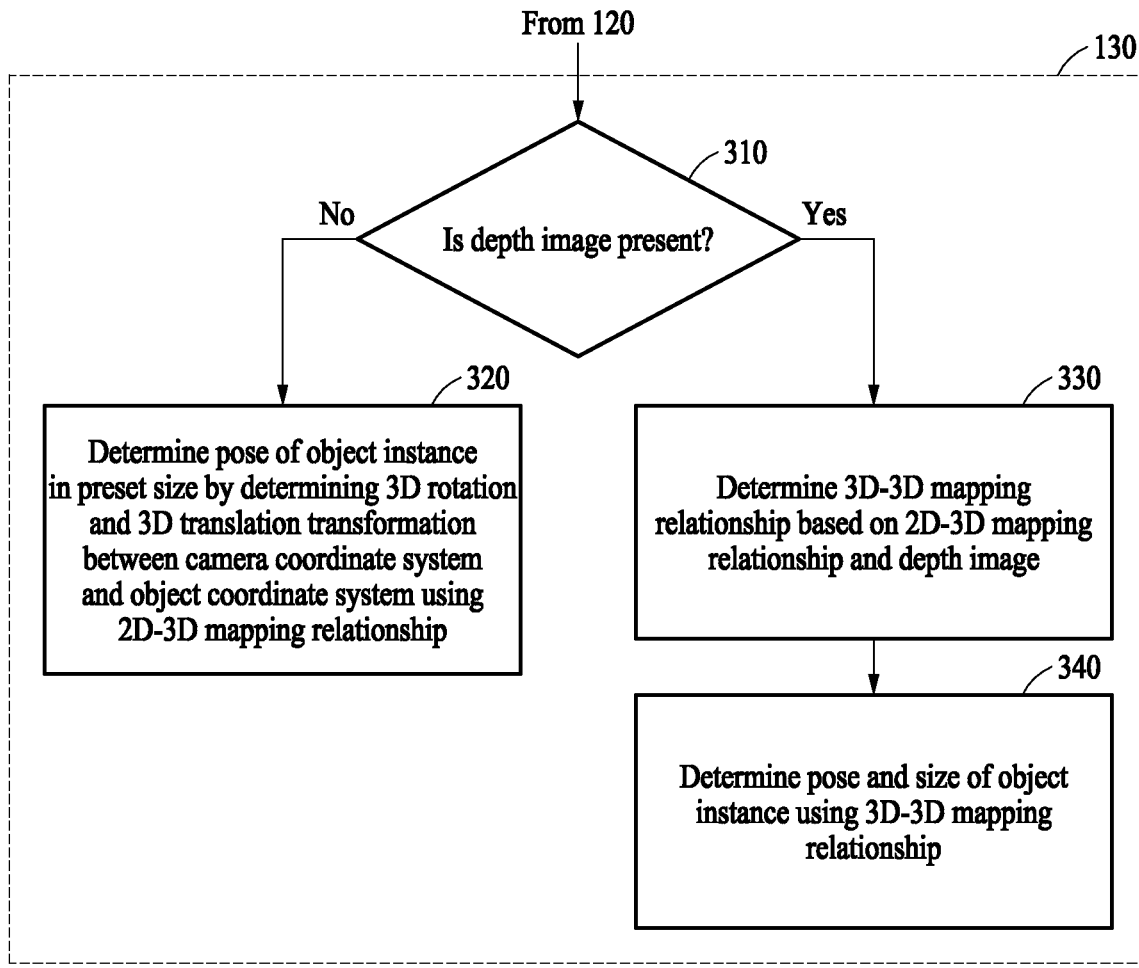
FIG. 3 illustrates an example of a method of determining a pose of an object instance in a single-frame image based on a two-dimensional (2D) and three-dimensional (3D) (2D-3D) mapping relationship by an object pose estimating apparatus.
Figure 4A:
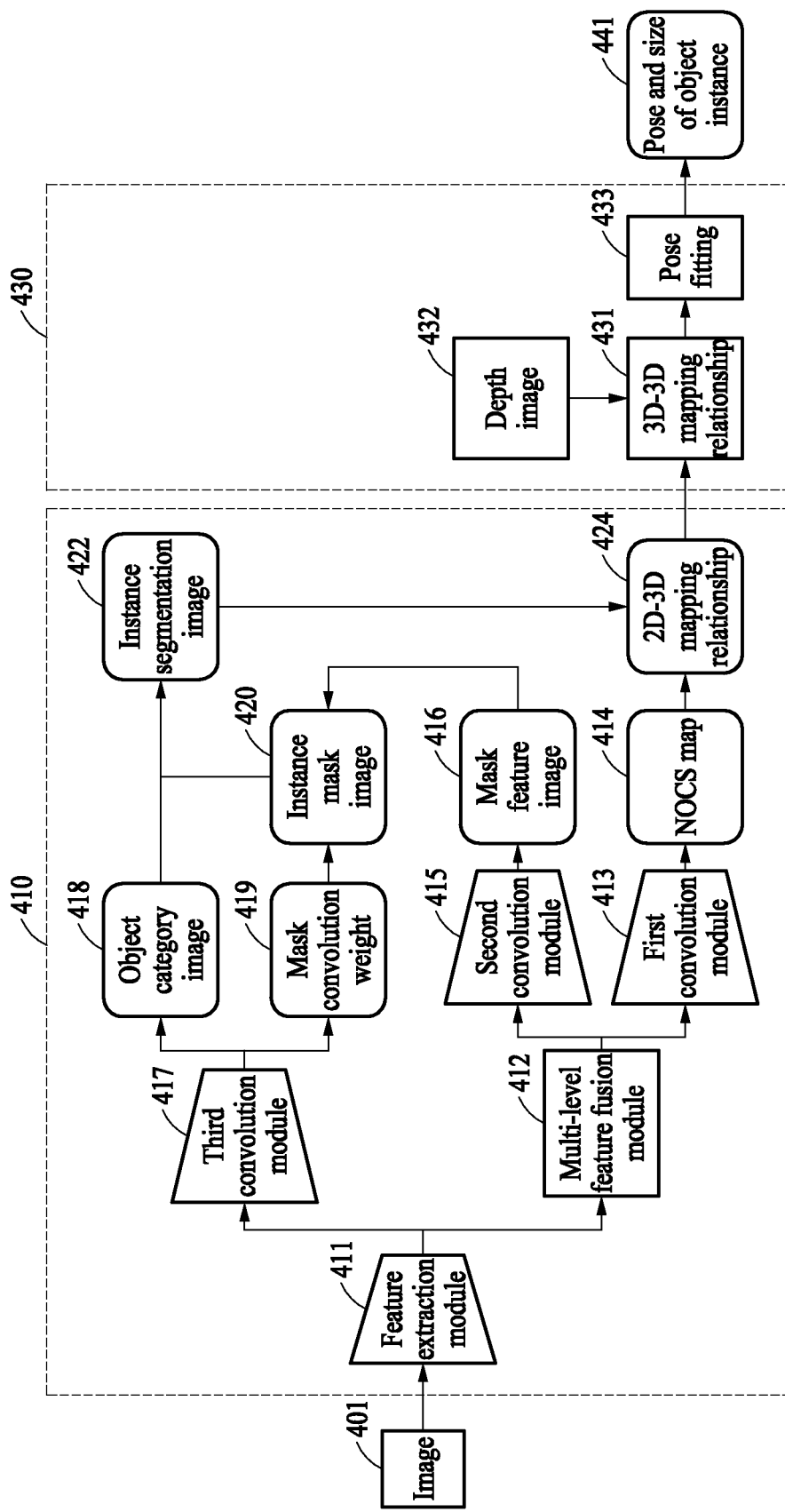
FIGS. 4A and 4B illustrate examples of a method (corresponding to the method of FIG. 3) of estimating a pose of an object instance performed by an object pose estimating apparatus.
Figure 4B:
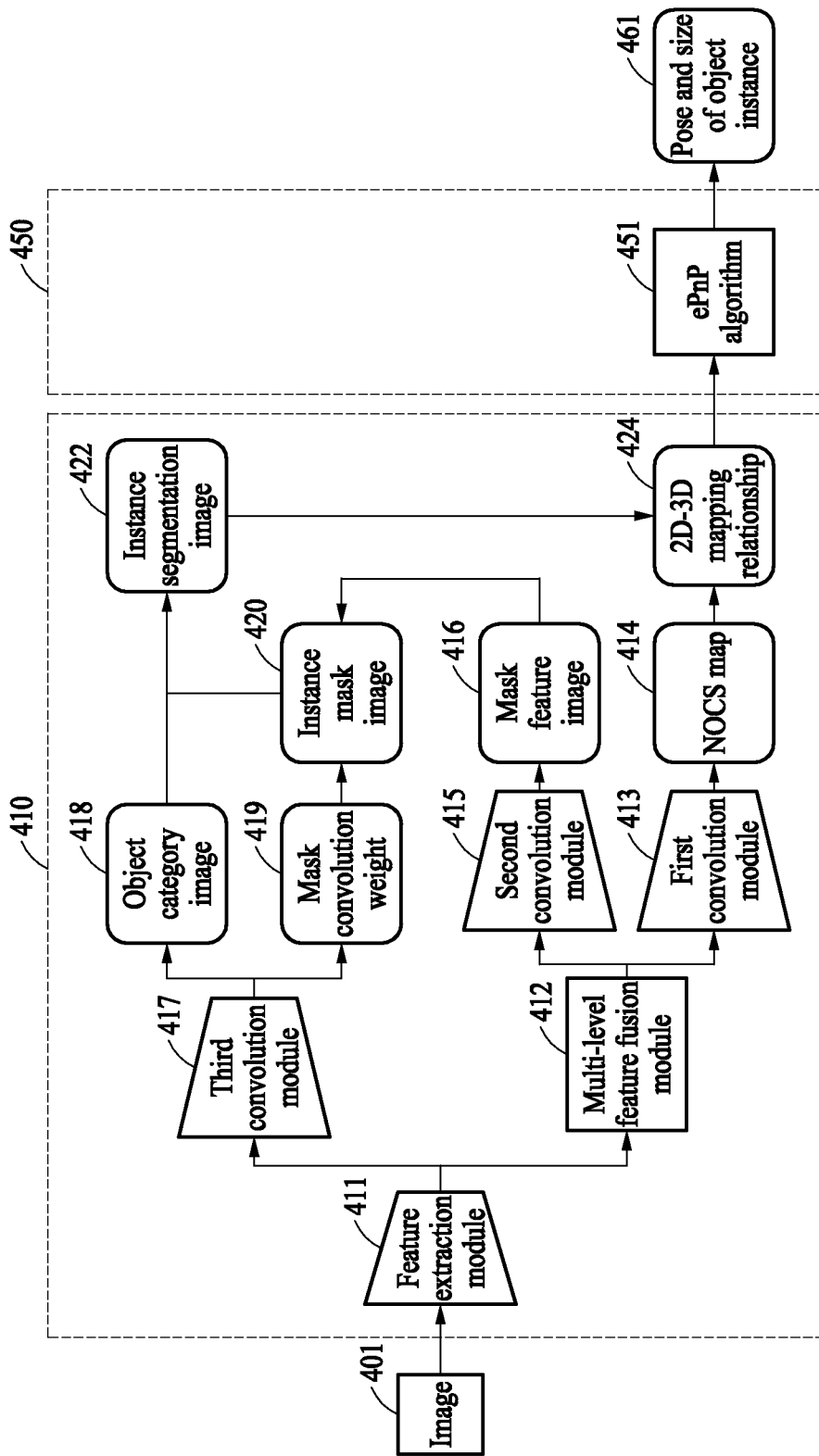

FIG. 3 illustrates an example of a method of determining a pose of an object instance in a single-frame image based on a 2D-3D mapping relationship by an object pose estimating apparatus.

The example of FIG. 3 will be described hereinafter in conjunction with examples of FIGS. 4A and 4B.

Referring to FIG. 3, in operation 310, the object pose estimating apparatus may determine whether a depth image corresponding to a single-frame image is present. The depth image may be an image in which the single-frame image and pixels are aligned.

For example, in response to a result of the determining in operation 310 that a depth image 432 corresponding to a single-frame image 401 is present, operations in a dotted-line box 430 in FIG. 4A may be performed. That is, the operations in the dotted-line box 430 may be performed to determine a pose 441 of an object instance based on the depth image 432 (in the presence of the depth image 432) and a 2D-3D mapping relationship 424.

However, in response to a result of the determining in operation 310 that the depth image 432 corresponding to the single-frame image 401 is not present, operations in a dotted-line box 450 in FIG. 4B may be performed. That is, the operations in the dotted-line box 450 may be performed to determine a pose 461 of an object instance based solely on the 2D-3D mapping relationship 424. All the operations in a dotted-line box 410 in FIG. 4B may be the same as all the operations in a dotted-line box 410 in FIG. 4A. However, the operations in the dotted-line box 430 in FIG. 4A and the operations in the dotted-line box 450 in FIG. 4B may be different.

That is, based on whether there is a depth image (e.g., the depth image 432) corresponding to a currently input single-frame image (e.g., the single-frame image 401), the operations in the box 430 of FIG. 4A or the operations in the box 450 of FIG. 4B may be selected to be performed. Hereinafter, the operations in the box 430 of FIG. 4A and the operations in the box 450 of FIG. 4B will be described in detail in a combined manner.

As shown in FIG. 3, in operation 330, when the depth image (e.g., the depth image 432) corresponding to the single-frame image is determined to be present as the result of the determining in operation 310, the object pose estimating apparatus may determine a three-dimensional and three-dimensional (3D-3D) mapping relationship (e.g., a 3D-3D mapping relationship 431) based on the 2D-3D mapping relationship 424 and the depth image 432. For example, as illustrated in FIG. 4A, the 3D-3D mapping relationship 431 may be obtained from the 2D-3D mapping relationship 424 and the depth image 432.

For example, operation 330 of determining the 3D-3D mapping relationship 431 based on the 2D-3D mapping relationship 424 and the depth image 432 may include obtaining 3D space coordinates of each pixel point by performing a 2D or 3D projection using the depth image 432, and transforming the 2D-3D mapping relationship 424 into the 3D-3D mapping relationship 431 based on the 3D space coordinates of each pixel point. For example, the object pose estimating apparatus may obtain 3D space coordinates of a pixel based on the depth image 432, determine 3D coordinates of a NOCS point corresponding to the pixel from the 2D-3D mapping relationship 424 based on 2D coordinates of the pixel, map the 3D space coordinates of the pixel obtained based on the depth image 432 and the 3D coordinates of the NOCS point corresponding to the pixel determined from the 2D-3D mapping relationship 424, and thereby obtain the 3D-3D mapping relationship 431 of the pixel.

Referring again to FIG. 3, in operation 340, after determining the 3D-3D mapping relationship, the object pose estimating apparatus may determine a pose and a size of an object instance using the 3D-3D mapping relationship. That is, the object pose estimating apparatus may obtain a pose and a size of an unseen object instance. For example, as illustrated in FIG. 4A, the object pose estimating apparatus may perform pose fitting 433 on the obtained 3D-3D mapping relationship 431, and determine the pose and size 441 of the object instance.

As shown in FIG. 3, in operation 320, when the depth image corresponding to the single-frame image is determined not to be present as the result of the determining in operation 310, the object pose estimating apparatus may determine a 3D rotation transformation and a 3D translation transformation between a camera coordinate system and an object coordinate system through an efficient perspective-n-point (ePnP) algorithm 451 using the 2D-3D mapping relationship 424, and determine a pose 461 of the object instance in a preset size. That is, the object pose estimating apparatus may obtain a pose of an object instance under the preset size. Although an actual size of an object instance may not be determined in operation 450 of FIG. 4B, a pose of the object instance in the preset size may be determined.

The methods described above with reference to FIGS. 4A and 4B may estimate a pose of an object in real time by adding an image-level NOCS mapping prediction structure (which is used to predict a NOCS map) to a single-stage DNN. In addition, the method described above with reference to FIG. 4A may increase the efficiency and accuracy in estimating a pose of an unseen object by combining the single-stage DNN and a depth image and estimating a pose and an actual size of the object through a pose fitting algorithm. Also, the method described above with reference to FIG. 4B may improve the robustness of a system for estimating a pose of an unseen object by estimating a pose of an object under a preset size based on a result of prediction by the single-stage DNN using an ePnP algorithm (e.g., the ePnP algorithm 451) in the absence of a depth image.

In the examples described above with reference to FIGS. 1 through 4B, there may be an inaccurate prediction value in a 3D coordinate value of a NOCS point predicted by a NOCS map. To solve an accuracy-related issue arising due to such an inaccurate prediction value, a pixel-level pixel error prediction structure may be added to the method described above with reference to FIG. 1 to remove the inaccurate prediction value from the NOCS map. Through implementing the pixel-level pixel error prediction structure to remove the inaccurate prediction value from the NOCS map, it is possible to improve the quality of the 3D coordinate value of the NOCS point predicted by the NOCS map and reduce abnormal mapping, which will be described in detail hereinafter with reference to FIGS. 5, and 6A and 6B.

Figure 5:
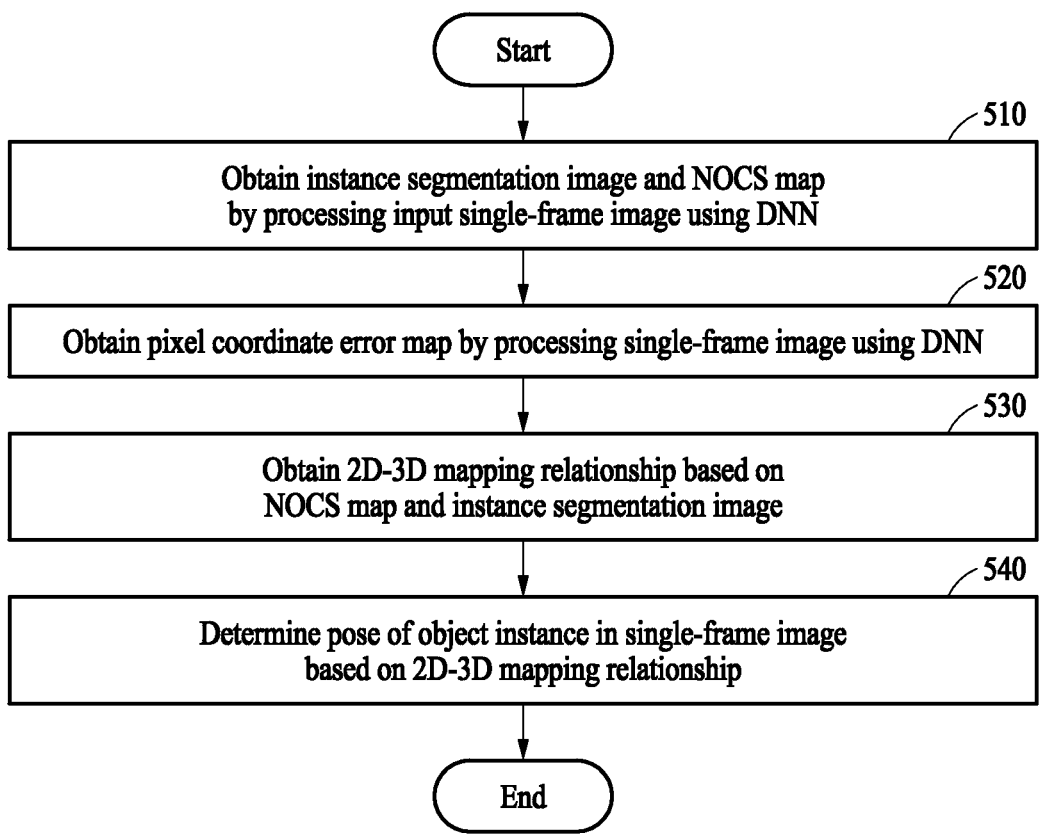
FIG. 5 illustrates another example of an object pose estimating method performed by an object pose estimating apparatus.

FIG. 5 illustrates another example of an object pose estimating method performed by an object pose estimating apparatus.

Figure 6A:
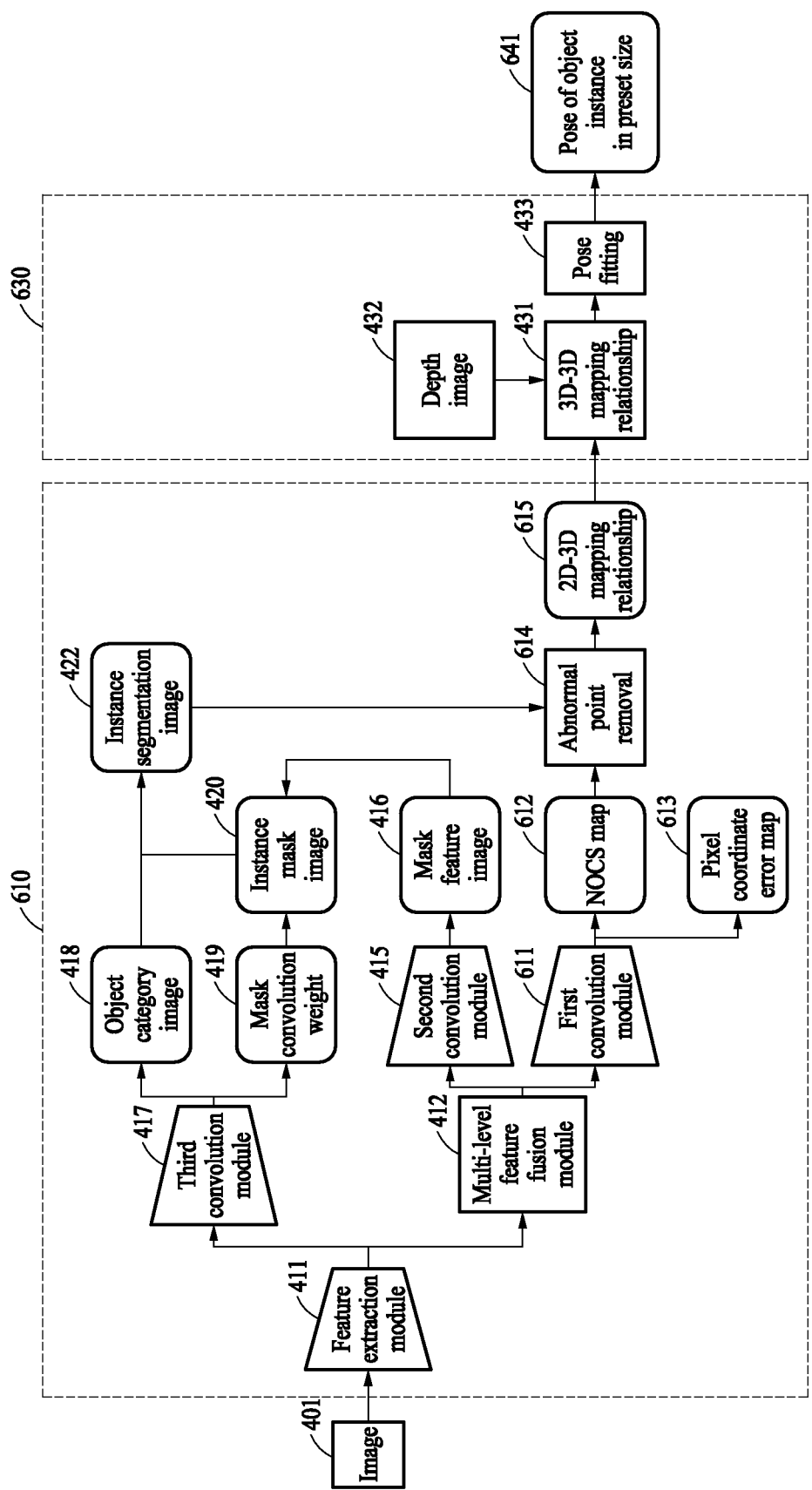
FIGS. 6A and 6B illustrate examples of a method (corresponding to the method of FIG. 5) of estimating a pose of an object instance.
Figure 6B:
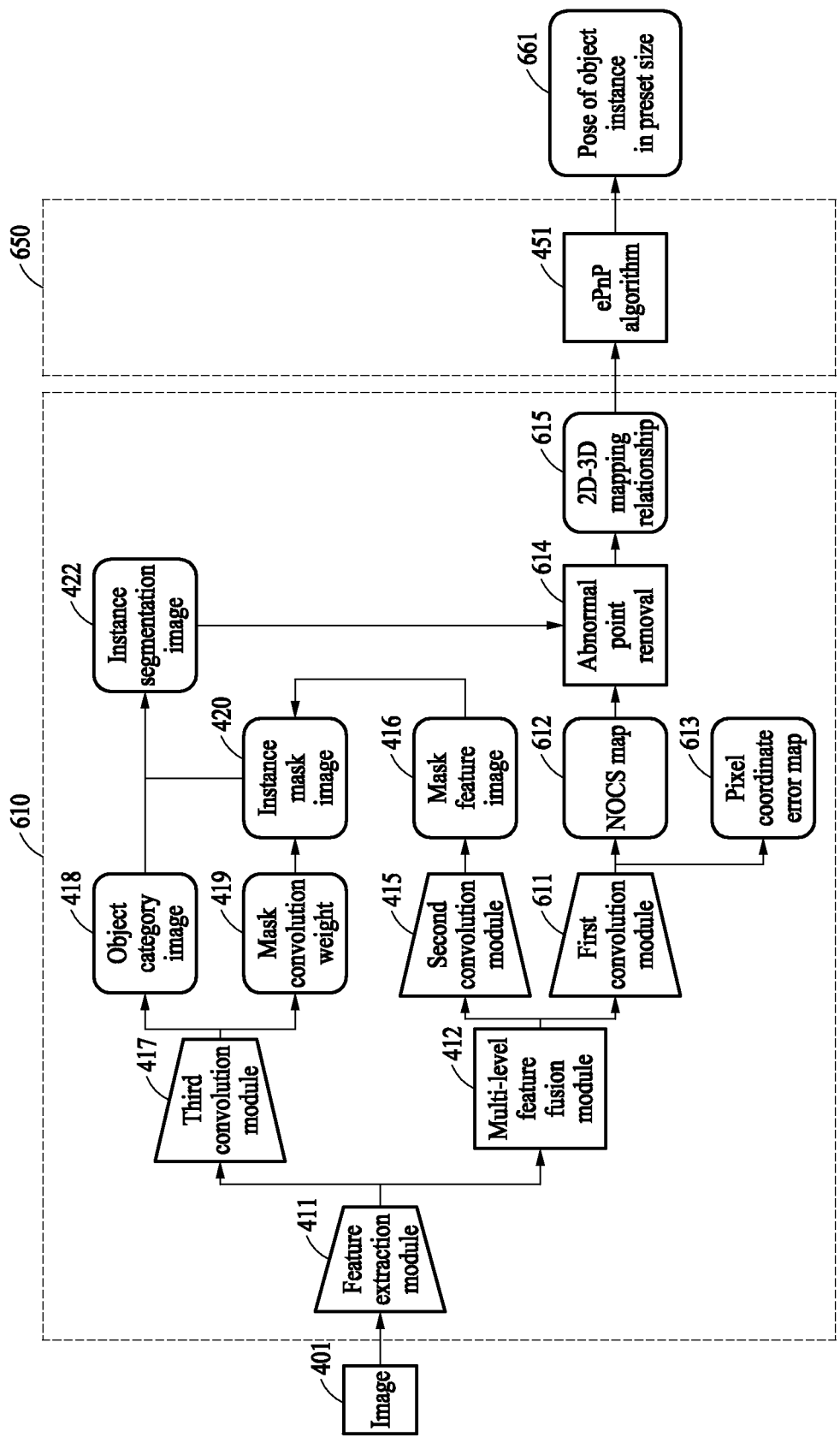

The example of FIG. 5 will be described hereinafter in conjunction with FIGS. 6A and 6B. FIGS. 6A and 6B illustrate examples of a method (corresponding to the method of FIG. 5) of estimating a pose of an object instance.

Referring to FIG. 5, in operation 510, an object pose estimating apparatus may obtain an instance segmentation image and a NOCS map by processing an input single-frame image using a single-stage DNN. Operation 510 may be the same as operation 110 described above with reference to FIG. 1, and thus a more detailed and repeated description of operation 510 of obtaining an instance segmentation image and a NOCS map will be omitted here for brevity.

In operation 520, the object pose estimating apparatus may obtain a pixel coordinate error map by processing the single-frame image using the single-stage DNN. Each coordinate error value of the pixel coordinate error map may indicate a difference between a predicted NOCS coordinate value and a real NOCS coordinate value for each pixel point in the single-frame image. That is, as the difference between the predicted NOCS coordinate value and the real NOCS coordinate value increases, the uncertainty or error rate in NOCS map prediction may increase. For example, each coordinate error value of the pixel coordinate error map may be represented as a sum of squares of the difference between the predicted NOCS coordinate value and the real NOCS coordinate value for each pixel point.

For example, operation 520 may include obtaining the pixel coordinate error map by performing a convolution on a single-scale image feature using a first convolution module of the single-stage DNN. Such an operation of obtaining the pixel coordinate error map may be performed after operation 220 described above with reference to FIG. 2, which will be described in more detail hereinafter with reference to FIGS. 6A and 6B. As illustrated in FIGS. 6A and 6B, in operations in a dotted-line box 610, a single-scale image feature output from a multi-level feature fusion module 412 may be input to a first convolution module 611. Compared to the methods described above with reference to FIGS. 4A and 4B, the first convolution module 611 of FIGS. 6A and 6B may generate a NOCS map, and also obtain a pixel coordinate error map by performing a convolution on the single-scale image feature.

In operation 530, the object pose estimating apparatus may obtain a 2D-3D mapping relationship based on the NOCS map and the instance segmentation image. For example, operation 530 of obtaining a 2D-3D mapping relationship may include constructing a preliminary 2D-3D mapping relationship of an object instance by obtaining a pixel point in the object instance in the single-frame image and a NOCS point of the pixel point, using the NOCS map and the instance segmentation image. In this example, the object pose estimating apparatus may obtain 2D coordinates of a pixel point in an object instance belonging to a category in the single-frame image using the instance segmentation image, and obtain 3D coordinates of a NOCS point corresponding to the pixel point in the single-frame image using the NOCS map. Subsequently, the object pose estimating apparatus may construct a preliminary 2D-3D mapping relationship of the pixel point based on the obtained 2D coordinates of the pixel point and the obtained 3D coordinates of the NOCS point corresponding to the pixel point.

Operation 530 of obtaining a 2D-3D mapping relationship may further include obtaining the 2D-3D mapping relationship by removing abnormal 2D-3D mapping from the preliminary 2D-3D mapping relationship using the pixel coordinate error map. Such an operation of obtaining the 2D-3D mapping relationship by removing the abnormal 2D-3D mapping from the preliminary 2D-3D mapping relationship using the pixel coordinate error map may include determining an error value greater than a preset threshold value in the pixel coordinate error map, and obtaining the 2D-3D mapping relationship by removing 2D-3D mapping corresponding to a NOCS point corresponding to the error value greater than the preset threshold value from the preliminary 2D-3D mapping relationship.

As described above, the pixel coordinate error map may represent a difference between a predicted NOCS coordinate value and a real NOCS coordinate value for each pixel point of the single-frame image, and an increase in the difference may represent an increase in uncertainty or error rate in NOCS map prediction. For example, each error value of the pixel coordinate error map may be compared to a preset threshold value. In this example, an error value being less than or equal to the preset threshold value may indicate that the accuracy of a predicted NOCS coordinate value of a NOCS point corresponding to the error value may be acceptable. However, an error value being greater than the preset threshold value may indicate a high inaccuracy of the NOCS coordinate value predicted by the NOCS point corresponding to the error value. Thus, in a case in which the error value is greater than the preset threshold value, the 2D-3D mapping corresponding to the NOCS point may need to be removed from the preliminary 2D-3D mapping relationship, and a stable 2D-3D mapping relationship that may represent an object pose may thereby be obtained. As illustrated in FIGS. 6A and 6B, a final 2D-3D mapping relationship 615 may be obtained by removing an abnormal point 614 using a NOCS map 612, a pixel coordinate error map 613, and an instance segmentation image 422, in a way different from the examples illustrated in FIGS. 4A and 4B. That is, the example illustrated in FIG. 6A may be different from the example illustrated in FIG. 4A in that the first convolution module 611 may further output the pixel coordinate error map 613 in addition to the NOCS map 612, and the 2D-3D mapping relationship 615 from which abnormal 2D-3D mapping is removed may be obtained using the NOCS map 612, the pixel coordinate error map 613, and the instance segmentation image 422. The example illustrated in FIG. 6B may also be different from the example illustrated in FIG. 4B, as described above.

In operation 540, the object pose estimating apparatus may determine a pose of the object instance in the single-frame image based on the 2D-3D mapping relationship. Operation 540 may be the same as operation 130 of FIG. 1, except that the 2D-3D mapping relationship used in operation 540 is a 2D-3D mapping relationship from which abnormal 2D-3D mapping is removed. Thus, a more detailed and repeated description of operation 540 will be omitted here for brevity.

As described above with reference to FIGS. 5, and 6A and 6B, a pixel-level pixel error prediction structure (which is used to predict a pixel coordinate error map) may be further applied to the examples described above with reference to FIGS. 1 through 4B to remove an inaccurate predicted NOCS coordinate value from a NOCS map and thus to improve the quality of mapping prediction and reduce abnormal mapping.

Another example method of estimating a pose and a size of an object instance will be described hereinafter with reference to FIG. 7.

Figure 7:
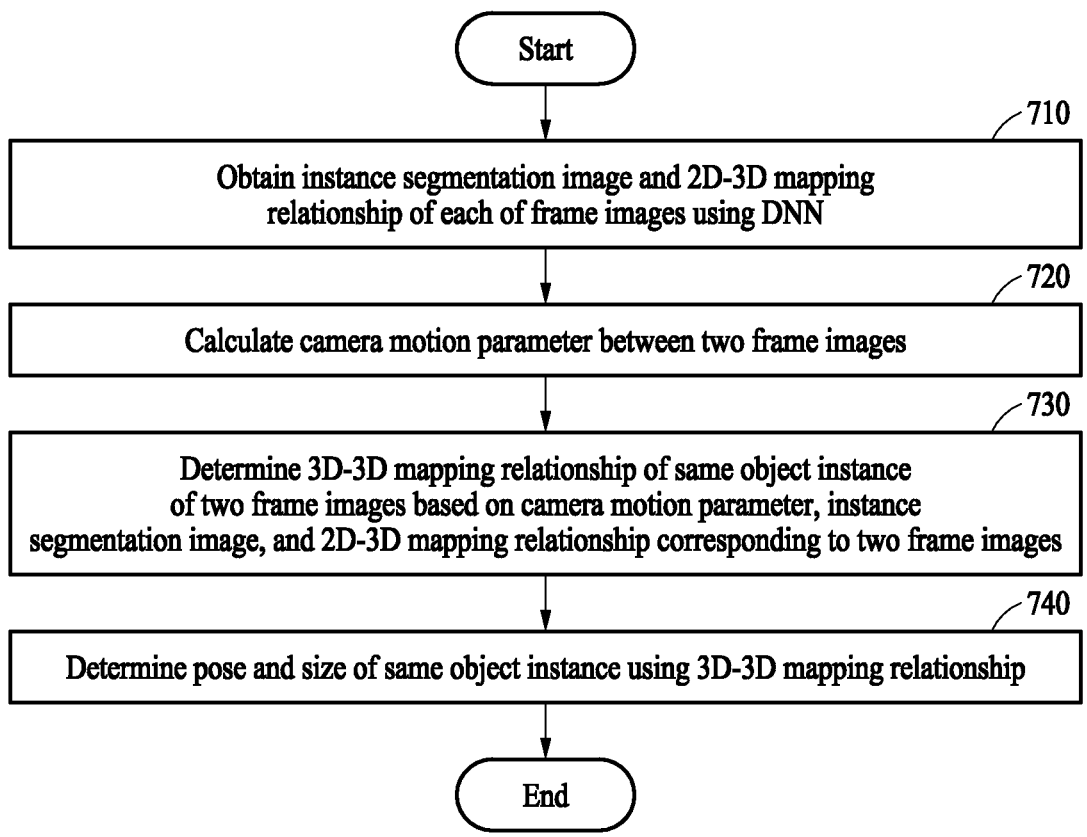
FIG. 7 illustrates an example of a method of estimating a pose and a size of an object instance using a multi-frame image by an object pose estimating apparatus.

FIG. 7 illustrates an example of a method of estimating a pose and a size of an object instance using a multi-frame image by an object pose estimating apparatus.

Referring to FIG. 7, in operation 710, an object pose estimating apparatus may obtain an instance segmentation image and a 2D-3D mapping relationship of each frame image of a plurality of frame images using a DNN. The input frame images may be a plurality of frame color images (e.g., RGB images) or frame gray images, for example.

For example, operation 710 of obtaining an instance segmentation image and a 2D-3D mapping relationship of each frame image using the DNN may include obtaining an instance segmentation image and a NOCS map of each frame image by processing each frame image using a single-stage DNN, and obtaining a 2D-3D mapping relationship of each frame image based on the NOCS map and the instance segmentation image of each frame image. This operation of obtaining an instance segmentation image and a NOCS map of each frame image and the operation of obtaining a 2D-3D mapping relationship of each frame may be the same as operations 110 and 120 of FIG. 1, and thus a more detailed and repeated description of the operations will be omitted here for brevity.

In addition, there may be an inaccurate prediction value in 3D coordinate values of a NOCS point predicted by the NOCS map. Thus, to solve an accuracy-related issue arising due to such an inaccurate prediction value, the method of another example embodiment described herein may apply a pixel-level pixel error prediction structure to remove the inaccurate prediction value in the NOCS map. Through applying the pixel-level pixel error prediction structure to remove the inaccurate prediction value in the NOCS map, it is possible to improve the quality of the 3D coordinate values of the NOCS point predicted by the NOCS map and reduce abnormal mapping.

For example, the method described above with reference to FIG. 7 may further include an operation of obtaining a pixel coordinate error map by processing each frame image using the single-stage DNN, before or after the operation of obtaining an instance segmentation image and a NOCS map of each frame image. In this example, the operation of obtaining a 2D-3D mapping relationship of each frame image may include constructing a preliminary 2D-3D mapping relationship of an object instance by obtaining a pixel point in the object instance in the single-frame image and a NOCS point of the pixel point using the NOCS map and the instance segmentation image, and obtaining the 2D-3D mapping relationship by removing abnormal 2D-3D mapping from the preliminary 2D-3D mapping relationship of the object instance using the pixel coordinate error map. This operation of obtaining the 2D-3D mapping relationship by obtaining the pixel coordinate error map, constructing the preliminary 2D-3D mapping relationship, and removing abnormal 2D-3D mapping from the preliminary 2D-3D mapping relationship using the pixel coordinate error map may be the same as operations 520 and 530 described above with reference to FIG. 5, and a more detailed and repeated description of the operation will be omitted here for brevity. That is, the 2D-3D mapping relationship used in a subsequent operation may be a 2D-3D mapping relationship obtained in operations 110 and 120 described above with reference to FIG. 1 in which abnormal 2D-3D mapping is present, or a 2D-3D mapping relationship obtained in operations 520 and 530 described above with reference to FIG. 5 from which abnormal 2D-3D mapping is removed.

Referring to FIG. 7, in operation 720, the object pose estimating apparatus may calculate a camera motion parameter between two frame images among the frame images.

In operation 730, the object pose estimating apparatus may determine a 3D-3D mapping relationship of the same object instance of the two frame images based on the camera motion parameter, the instance segmentation image, and the 2D-3D mapping relationship that correspond to the two frame images.

In operation 740, the object pose estimating apparatus may determine a pose and a size of the same object instance using the 3D-3D mapping relationship.

Figure 8:
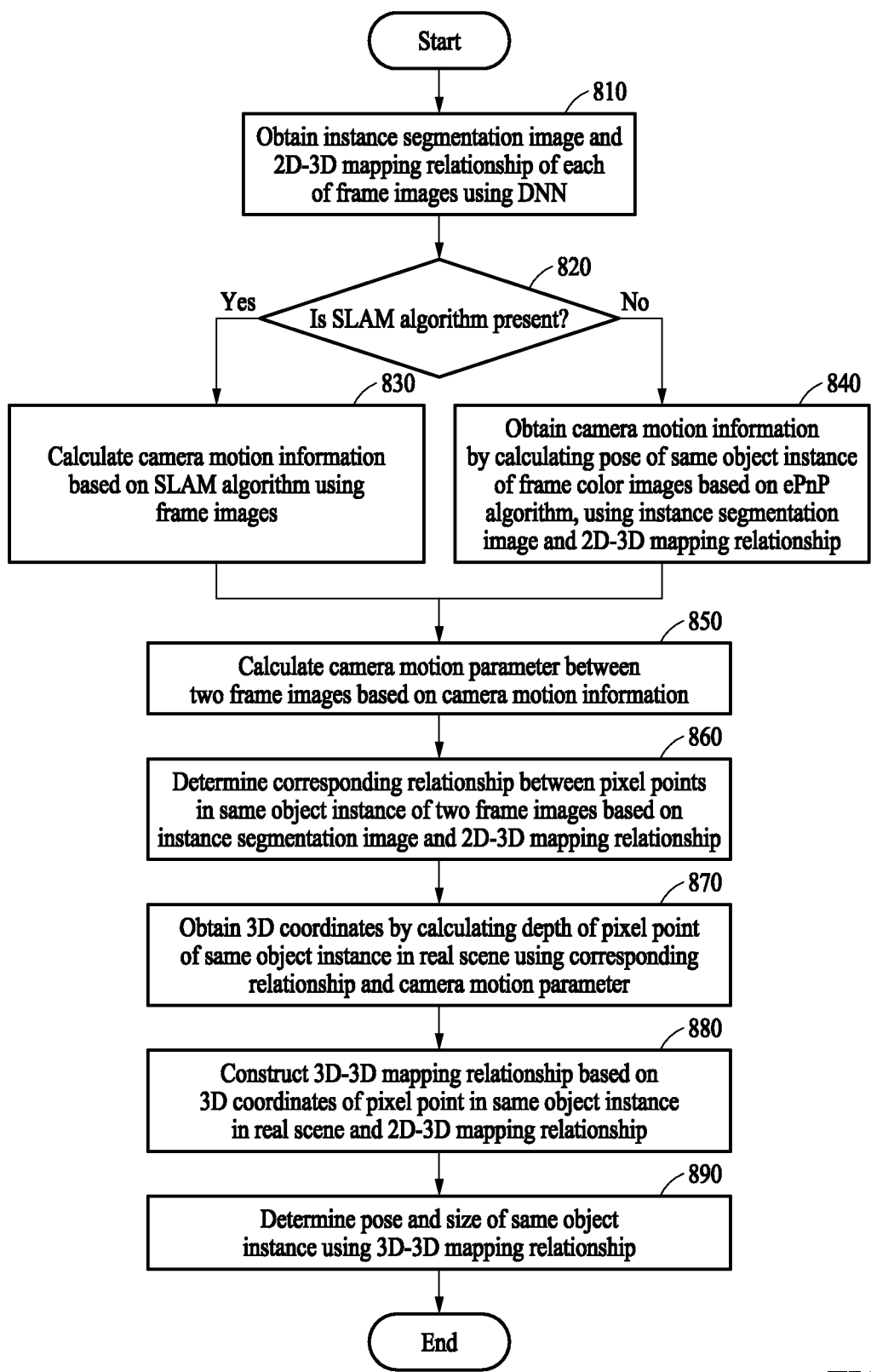
FIG. 8 illustrates an example of a method (corresponding to the method of FIG. 7) of estimating a pose and a size of an object instance.

FIG. 8 illustrates an example of a detailed method (corresponding to the method of FIG. 7) of estimating a pose and a size of an object instance.

Referring to FIG. 8, in operation 810, the object pose estimating apparatus may obtain an instance segmentation image and a 2D-3D mapping relationship of each of frame images using a DNN. Operation 810 may be the same as operation 710 described above with reference to FIG. 7, and thus a more detailed and repeated description of operation 810 will be omitted here for brevity.

In operations 820 through 840, the object pose estimating apparatus may determine camera motion information based on the frame images. For example, in operation 820, the object pose estimating apparatus may determine whether a simultaneous localization and mapping (SLAM) algorithm is present in a current system.

In operation 830, when the SLAM algorithm is present in the current system, the object pose estimating apparatus may directly calculate the camera motion information based on the SLAM algorithm using the frame images. That is, the object pose estimating apparatus may calculate a camera motion parameter.

In operation 840, when the SLAM algorithm is not present in the current system, the object pose estimating apparatus may obtain the camera motion information by calculating a pose of the same object instance in the frame images based on an ePnP algorithm (or an established pose estimation algorithm) using the instance segmentation image and the 2D-3D mapping relationship. For example, when the SLAM algorithm is not present in the current system, the object pose estimating apparatus may obtain the pose of the object instance in the images using the ePnP algorithm under the assumption that a size of the object instance in the instance segmentation image is known, and obtain the camera motion information based on the obtained pose of the object instance.

That is, the camera motion information may be determined in operations 820 through 840.

In operation 850, the object pose estimating apparatus may calculate a camera motion parameter between two frame images among the frame images based on the camera motion information. For example, the object pose estimating apparatus may select the two frame images as a stereo image pair from among the frame images based on a preset standard, and calculate the camera motion parameter between the images of this stereo image pair. In this example, the preset standard may be that the same object instance needs to have a certain transformation and rotation in the selected two frame images, and that is, an overlapping region needs to be present in the selected two frame images. Operations 820 through 850 described above may be more detailed operations of operation 720 described above with reference to FIG. 7.

In operation 860, the object pose estimating apparatus may determine a corresponding relationship between pixels included in the same object instance of the two frame images based on the instance segmentation image and the 2D-3D mapping relationship. For example, the object pose estimating apparatus may determine 2D coordinates of a pixel point corresponding to the same object instance (which is determined based on the instance segmentation image) included in each of the two frame images corresponding to 3D coordinates of the same NOCS point, based on two 2D-3D mapping relationships of the two frame images, and may obtain a corresponding relationship between pixel points included in the same object instance of the two frame images.

In operation 870, the object pose estimating apparatus may obtain 3D coordinates by calculating a depth of the pixel point included in the same object instance in a real scene using the corresponding relationship and the camera motion parameter. For example, the object pose estimating apparatus may obtain the 3D coordinates by calculating the depth of the pixel point included in the same object instance in the real scene, using the corresponding relationship and the camera motion parameter, through a triangulation method.

In operation 880, the object pose estimating apparatus may construct a 3D-3D mapping relationship based on the 3D coordinates of the pixel point included in the same object instance in the real scene and the 2D-3D mapping relationship. For example, the object pose estimating apparatus may determine 3D coordinates of one pixel point in a real scene, determine 3D coordinates of a NOCS point corresponding to the pixel point in a 2D-3D mapping relationship based on 2D coordinates of the pixel point, and then construct a 3D-3D mapping relationship between the 3D coordinates of the pixel point in the real scene and the 3D coordinates of the NOCS point corresponding to the pixel point determined in the 2D-3D mapping relationship.

In operation 890, the object pose estimating apparatus may determine a pose and a size of the same object instance using the 3D-3D mapping relationship, through a pose fitting method. Operation 890 may be the same as operation 740 described above with reference to FIG. 7.

The methods described above with reference to FIGS. 7 and 8 may estimate a pose and a size of an unseen object using a plurality of frame images by combining a single-stage DNN and a camera motion in a case in which a depth image is omitted or noise occurs.

Hereinafter, an apparatus corresponding to the methods described above with reference to FIGS. 1 through 8 will be described in detail with reference to FIGS. 9 and 10.

Figure 9:
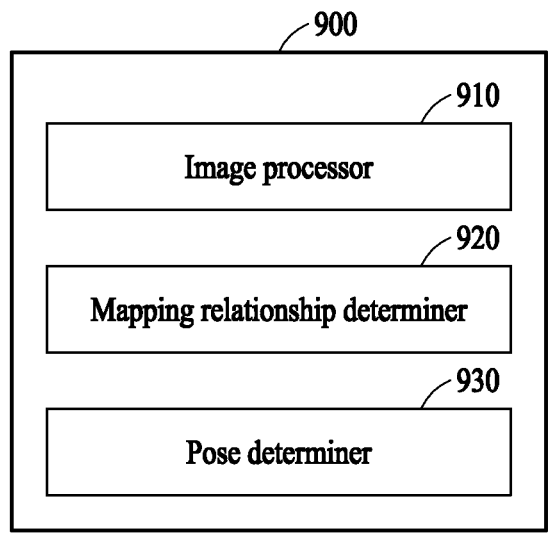
FIG. 9 illustrates an example of an object pose estimating apparatus.

FIG. 9 illustrates an example of an object pose estimating apparatus.

Referring to FIG. 9, an object pose estimating apparatus 900 may include, for example, an image processor 910, a mapping relationship determiner 920, and a pose determiner 930.

The image processor 910 may obtain an instance segmentation image and a NOCS map by processing an input single-frame image using a single-stage DNN. The input single-frame image may be a color image (e.g., an RGB image) or a gray image, for example.

For example, the image processor 910 may obtain a multi-scale image feature by extracting a feature from the single-frame image using a feature extraction module of the single-frame image. For a more detailed description of an operation of obtaining the multi-scale image feature by extracting the feature from the single-frame image, reference may be made to the description of operation 210 of FIG. 2.

The image processor 910 may obtain the NOCS map by obtaining a single-scale image feature by fusing the multi-scale image feature using a multi-level feature fusion module of the single-stage DNN, and performing a convolution on the single-scale image feature using a first convolution module of the single-stage DNN. For a more detailed description of operations of obtaining the single-scale image feature and obtaining the NOCS map, reference may be made to the description of operations 220 and 230 of FIG. 2.

The image processor 910 may obtain the instance segmentation image by obtaining a mask feature image by performing a convolution on the single-scale image feature using a second convolution module of the single-stage DNN, obtaining an object category image and a mask convolution weight of each scale through a convolution corresponding to an image feature of each scale of the multi-scale image feature using a third convolution module of the single-stage DNN, obtaining a multi-scale instance mask image by performing a convolution on the mask feature image and the multi-scale mask convolution weight, and obtaining the instance segmentation image using the multi-scale instance mask image and the multi-scale object category image. For a more detailed description of the foregoing operations, reference may be made to the description of operations 240 through 270 of FIG. 2.

The mapping relationship determiner 920 may obtain a 2D-3D mapping relationship based on the NOCS map and the instance segmentation image. For example, the mapping relationship determiner 920 may obtain 2D coordinates of a pixel point in an object instance belonging to a category of the single-frame image using the instance segmentation image, obtain 3D coordinates of a NOCS point corresponding to the pixel point in the single-frame image using the NOCS map, and construct a 2D-3D mapping relationship of the pixel point based on the obtained 2D coordinates of the pixel point and the obtained 3D coordinates of the NOCS point corresponding to the pixel point.

To solve an accuracy-related issue arising due to an inaccurate prediction value that may be present in 3D coordinate values of a NOCS point predicted by the NOCS map, a pixel-level pixel error prediction structure may be applied to the object pose estimating apparatus 900 to remove the inaccurate prediction value in the NOCS map, and to improve the quality of the 3D coordinate values of the NOCS point predicted by the NOCS map and reduce abnormal mapping.

For example, the image processor 910 may obtain a pixel coordinate error map by processing the single-frame image using the single-stage DNN. In this example, the image processor 910 may obtain the pixel coordinate error map by performing a convolution on the single-scale image feature using the first convolution module. Each coordinate error value of the pixel coordinate error map may represent a difference between a predicted NOCS coordinate value and a real NOCS coordinate value of each pixel point of the single-frame image. An increase in such a difference may indicate an increase in the uncertainty or error rate of NOCS map prediction. For example, each coordinate error value of the pixel coordinate error map may be represented as a sum of squares of the difference between the predicted NOCS coordinate value and the real NOCS coordinate value of each pixel.

When generating the pixel coordinate error map, the mapping relationship determiner 920 may construct a preliminary 2D-3D mapping relationship of an object instance by obtaining a pixel point in the object instance of the single-frame image and a NOCS point corresponding to the pixel point using the NOCS map and the object instance segmentation image, and obtain a 2D-3D mapping relationship by removing an abnormal 2D-3D mapping relationship from the preliminary 2D-3D mapping relationship using the pixel coordinate error map. For example, the mapping relationship determiner 920 may obtain the 2D-3D mapping relationship by determining an error value greater than a preset threshold value in the pixel coordinate error map and removing 2D-3D mapping corresponding to a NOCS point corresponding to the error value greater than the preset threshold value from the preliminary 2D-3D mapping relationship. For a more detailed description of operations of obtaining a pixel coordinate error map and obtaining the 2D-3D mapping relationship and, reference may be made to the description of operations 520 and 530 of FIG. 5 of obtaining a 2D-3D mapping relationship from which abnormal 2D-3D mapping is removed. The 2D-3D mapping relationship to be described hereinafter may be a 2D-3D mapping relationship in which abnormal 2D-3D mapping is present or a 2D-3D mapping relationship from which abnormal 2D-3D mapping is removed.

The pose determiner 930 may determine a pose of the object instance in the single-frame image based on the 2D-3D mapping relationship.

For example, the pose determiner 930 may determine whether a depth image corresponding to the single-frame image is present. In this example, the depth image may be an image in which the single-frame image and pixels are aligned.

When the depth image corresponding to the single-frame image is present, the pose determiner 930 may determine a 3D-3D mapping relationship based on the 2D-3D mapping relationship and the depth image, and determine a pose and a size of the object instance using the determined 3D-3D mapping relationship. For example, the pose determiner 930 may determine the 3D-3D mapping relationship by obtaining 3D space coordinates of each pixel point by performing a 2D or 3D projection using the depth image, and by transforming the 2D-3D mapping relationship into the 3D-3D mapping relationship based on the obtained 3D space coordinates of each pixel point.

In contrast, when the depth image corresponding to the single-frame image is not present, the pose determiner 930 may determine a pose of the object instance in a preset size by determining a 3D rotation transformation and a 3D translation transformation between a camera coordinate system and an object coordinate system using the 2D-3D mapping relationship. For example, the pose determiner 930 may determine the 3D rotation transformation and the 3D translation transformation between the camera coordinate system and the object coordinate system based on an ePnP algorithm (or an established pose estimation algorithm) using the 2D-3D mapping relationship. For a more detailed description of the foregoing operations, reference may be made to the description provided above with reference to FIG. 3.

The object pose estimating apparatus 900 of FIG. 9 may estimate a pose and a size of an unseen object in real time by adding an image-level NOCS mapping prediction structure (which is used to predict a NOCS map) to a single-stage DNN. In addition, when a depth image is present, the object pose estimating apparatus 900 may combine the single-stage DNN and the depth image and estimate the pose and the size of the object through a pose fitting algorithm, thereby increasing the efficiency and accuracy in estimating a pose of an unseen object. In contrast, when the depth image is not present, the object pose estimating apparatus 900 may combine the single-stage DNN and a camera motion and estimate the pose and the size of the object, thereby improving the robustness of a system for estimating a pose of an unseen object.

Hereinafter, another example of an object pose estimating apparatus will be described with reference to FIG. 10. An object pose estimating apparatus 1000 of FIG. 10 may perform the methods described above with reference to FIGS. 7 and 8.

Figure 10:
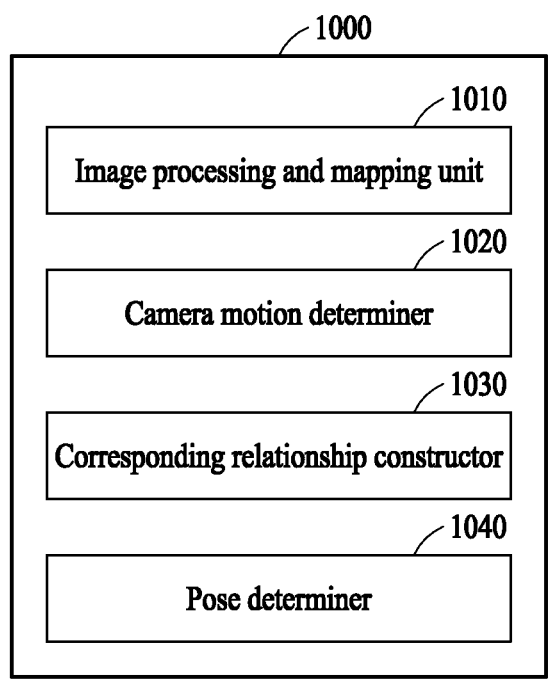
FIG. 10 illustrates another example of an object pose estimating apparatus.

FIG. 10 illustrates another example of an object pose estimating apparatus.

Referring to FIG. 10, the object pose estimating apparatus 1000 may include, for example, an image processing and mapping unit 1010 (or image processor and mapper 1010), a camera motion determiner 1020, a corresponding relationship constructor 1030, and a pose determiner 1040.

The image processing and mapping unit 1010 may obtain an instance segmentation image and a 2D-3D mapping relationship of each frame image of an input multi-frame image using a DNN. The input multi-frame image may be a plurality of frame color images (e.g., RGB images) or gray images, for example.

For example, the image processing and mapping unit 1010 may include an image processor and a mapping relationship determiner. In this example, the image processor may obtain the instance segmentation image and a NOCS map of each frame image by processing each frame image using the single-stage DNN. In this example, the mapping relationship determiner may obtain the 2D-3D mapping relationship of each frame image based on the NOCS map and the instance segmentation image of each frame image. In addition, the image processor may obtain a pixel coordinate error map by processing each frame image using the single-stage DNN. The mapping relationship determiner may obtain the 2D-3D mapping relationship by constructing a preliminary 2D-3D mapping relationship of an object instance by obtaining a pixel point in the object instance of each frame image and a NOCS point corresponding to the pixel point, using the NOCS map and the instance segmentation image, and by removing abnormal 2D-3D mapping from the preliminary 2D-3D mapping relationship using the pixel coordinate error map. For example, the image processor and the mapping relationship determiner may perform the same operations as those performed by the image processor 910 and the mapping relationship determiner 920 of FIG. 9, and thus a more detailed and repeated description of the image processor and the mapping relationship determiner will be omitted here for brevity.

The camera motion determiner 1020 may calculate a camera motion parameter between two frame images among a plurality of frame images of the multi-frame image. For example, the camera motion determiner 1020 may calculate the camera motion parameter between the two frame images among the frame images by determining camera motion information based on the frame images and calculating the camera motion parameter between the two frame images based on the camera motion information.

When a SLAM algorithm is present in a current system, the camera motion determiner 1020 may calculate the camera motion information based on the SLAM algorithm using the frame images. In contrast, when the SLAM algorithm is not present in the current system, the camera motion determiner 1020 may obtain the camera motion information by calculating a pose of the same object instance in the frame images using the instance segmentation image and the 2D-3D mapping relationship. For example, the camera motion determiner 1020 may obtain the camera motion information by calculating a pose of the same object instance from the frame images based on an ePnP algorithm using the instance segmentation image and the 2D-3D mapping relationship. For a more detailed description of the foregoing operations, reference may be made to the description of operations 820 through 850 of FIG. 8.

The corresponding relationship constructor 1030 may determine a 3D-3D mapping relationship of the same object instance of the two frame images based on the camera motion parameter, the instance segmentation image, and the 2D-3D mapping relationship that correspond to the two frame images. For example, the corresponding relationship constructor 1030 may construct the 3D-3D mapping relationship by determining a corresponding relationship between pixel points included in the same object instance of the two frame images based on the instance segmentation image and the 2D-3D mapping relationship, obtaining 3D coordinates by calculating a depth of a pixel point in the same object instance in a real scene using the corresponding relationship and the camera motion parameter, and constructing the 3D-3D mapping relationship based on the 3D coordinates of the pixel point in the same object instance in the real scene and on the 2D-3D mapping relationship. For a more detailed description of the foregoing operations, reference may be made to the description of operations 860 through 880 of FIG. 8.

The pose determiner 1040 may determine a pose and a size of the same object instance using the 3D-3D mapping relationship.

The object pose estimating apparatus 1000 described above with reference to FIG. 10 may combine a single-stage DNN and a camera motion and estimate a pose and a size of an unseen object using a plurality of frame images, in a case in which a depth image is omitted or noise is present.

Figure 11:
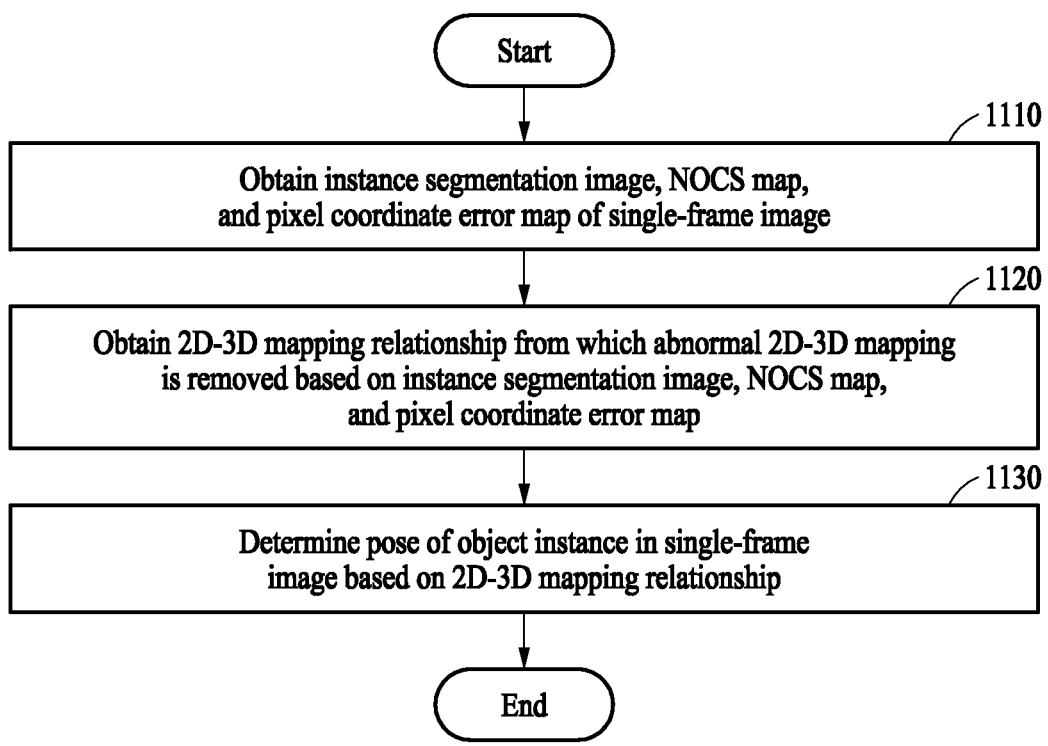
FIG. 11 illustrates another example of an object pose estimating method performed by an object pose estimating apparatus.

FIG. 11 illustrates another example of an object pose estimating method performed by an object pose estimating apparatus.

Figure 12:
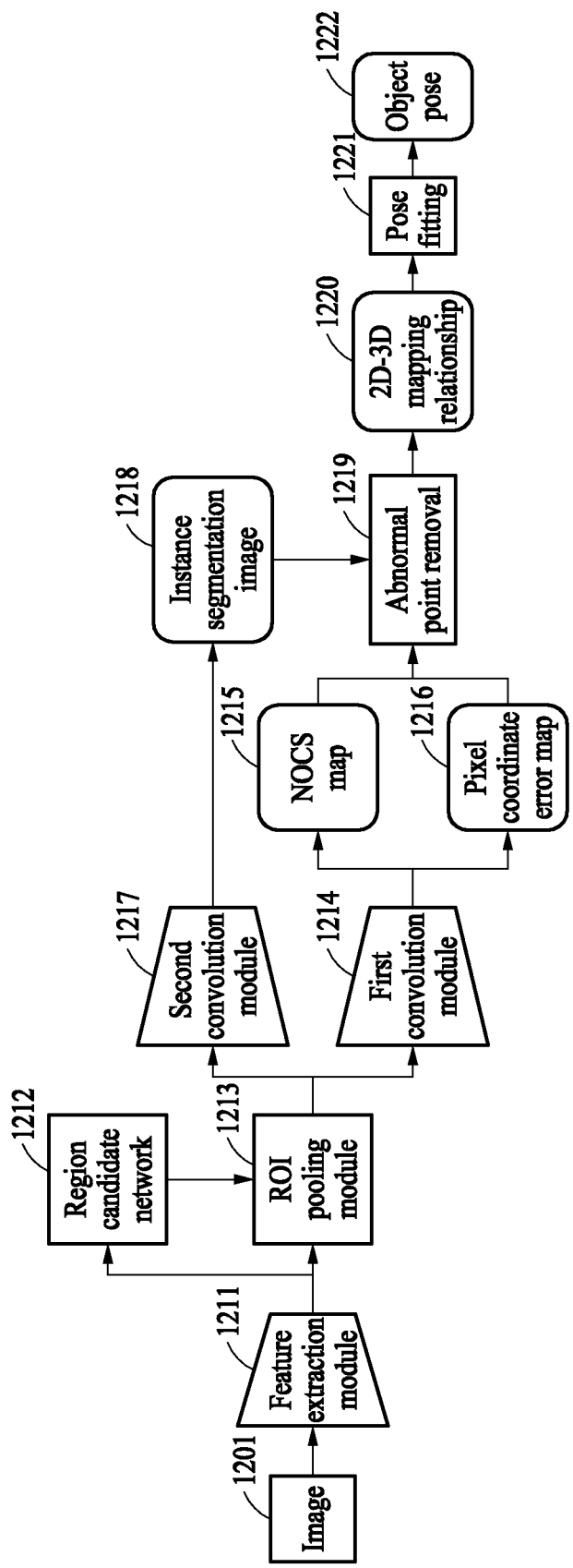
FIG. 12 illustrates another example of a method of estimating a pose of an object by an object pose estimating apparatus.

The method of FIG. 11 will be described hereinafter in conjunction with FIG. 12. FIG. 12 illustrates another example of a method of estimating a pose of an object by an object pose estimating apparatus.

Referring to FIG. 11, in operation 1110, an object pose estimating apparatus may obtain an instance segmentation image, a NOCS map, and a pixel coordinate error map of a single-frame image. The single-frame image may be a color image (e.g., an RGB image) or a gray image, for example.

For example, as in operations 510 and 520 described above with reference to FIG. 5, the object pose estimating apparatus may obtain the instance segmentation image, the NOCS map, and the pixel coordinate error map of the single-frame image through a single-stage DNN. For another example, as described with reference to FIG. 12, the object pose estimating apparatus may obtain the instance segmentation image, the NOCS map, and the pixel coordinate error map by processing the single-frame image through a two-stage DNN illustrated in FIG. 12.

For example, as illustrated in FIG. 12, the object pose estimating apparatus may obtain a multi-scale image feature from a single-frame image 1201 through a feature extraction module 1211. The multi-scale image feature may be input to each of a region candidate network 1212 and a region of interest (ROI) align or pooling module 1213. In this example, the region candidate network 1212 may be used to determine an ROI. Information associated with the determined ROI may be input to the ROI pooling module 1213. The ROI pooling module 1213 may output an image feature corresponding to each ROI based on the multi-scale image feature received from the feature extraction module 1211 and the information associated with the determined ROI received from the region candidate network 1212. A first convolution module 1214 may obtain a NOCS map 1215 and a pixel coordinate error map 1216 using the image feature corresponding to each ROI output from the ROI pooling module 1213. The NOCS map 1215 may be an object-level NOCS map, and each error value of the pixel coordinate error map 1216 may represent a difference between a predicted NOCS coordinate value and a real NOCS coordinate value for each pixel point of the single-frame image 1201. A second convolution module 1217 may obtain an instance segmentation image 1218 using the image feature output from the ROI pooling module 1213.

Referring to FIG. 11 operation 1120, the object pose estimating apparatus may obtain a 2D-3D mapping relationship from which abnormal 2D-3D mapping is removed based on the instance segmentation image, the NOCS map, and the pixel coordinate error map.

For example, as in operation 530 of FIG. 5, the object pose estimating apparatus may obtain a preliminary 2D-3D mapping relationship using an image-level NOCS map and an instance segmentation image, and remove abnormal 2D-3D mapping from the preliminary 2D-3D mapping relationship using a pixel coordinate error map. Also, as illustrated in FIG. 12, the object pose estimating apparatus may obtain a preliminary 2D-3D mapping relationship using an object-level NOCS map 1215 and an instance segmentation image 1218, and then remove abnormal 2D-3D mapping by removing an abnormal point 1219 from the preliminary 2D-3D mapping relationship using a pixel coordinate error map 1216. The NOCS map 1215 obtained as described with reference to FIG. 12 may be an object-level NOCS map, and the NOCS map obtained as described with reference to FIG. 5 may be an image-level NOCS map. However, an operation (refer to FIG. 12) of obtaining the preliminary 2D-3D mapping relationship using the object-level NOCS map 1215 and the instance segmentation image 1218, and removing abnormal 2D-3D mapping from the preliminary 2D-3D mapping relationship using the pixel coordinate error map 1216 may be practically the same as an operation (refer to FIG. 5) of obtaining the preliminary 2D-3D mapping relationship using the image-level NOCS map and the instance segmentation image, and removing abnormal 2D-3D mapping from the preliminary 2D-3D mapping relationship using the pixel coordinate error map. Thus, a more detailed and repeated description of the operation of obtaining a 2D-3D mapping relationship 1220 from which abnormal 2D-3D mapping is removed based on the instance segmentation image 1218, the NOCS map 1215, and the pixel coordinate error map 1216 will be omitted here for brevity.

Referring to FIG. 11, in operation 1130, the object pose estimating apparatus may determine a pose 1222 of an object instance in the single-frame image 1201 based on the 2D-3D mapping relationship 1220. Operation 1130 may be the same as operation 540 described above with reference to FIG. 5, and thus a more detailed and repeated description of operation 1130 will be omitted here for brevity.

The method described above may remove an inaccurate prediction value from a NOCS map by applying a pixel-level pixel error prediction structure, and may thereby improve the quality of 3D coordinate values of a predicted NOCS point in the NOCS map and reduce abnormal mapping.

Figure 13:
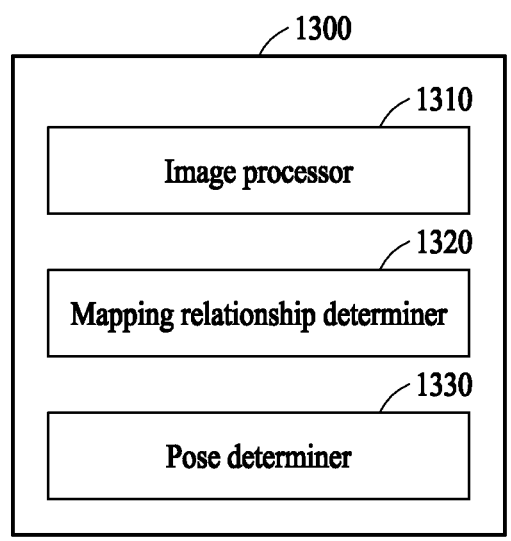
FIG. 13 illustrates another example of an object pose estimating apparatus.

FIG. 13 illustrates another example of an object pose estimating apparatus.

Referring to FIG. 13, an object pose estimating apparatus 1300 may include, for example, an image processor 1310, a mapping relationship determiner 1320, and a pose determiner 1330.

The image processor 1310 may obtain an instance segmentation image, a NOCS map, and a pixel coordinate error map of a single-frame image.

The mapping relationship determiner 1320 may obtain a 2D-3D mapping relationship from which abnormal 2D-3D mapping is removed, based on the instance segmentation image, the NOCS map, and the pixel coordinate error map.

The pose determiner 1330 may determine a pose of an object instance in the single-frame image based on the 2D-3D mapping relationship.

The image processor 1310, the mapping relationship determiner 1320, and the pose determiner 1330 may perform, respectively, operations 1110, 1120, and 1130 described above with reference to FIG. 11, and thus a more detailed and repeated description of the image processor 1310, the mapping relationship determiner 1320, and the pose determiner 1330 will be omitted here for brevity.

According to example embodiments, a method of estimating a pose and a size of an object by an electronic apparatus, for example, an object pose estimating apparatus described herein, may obtain output data including a recognition image or a pose and a size of an object in the image by using image data as input data for an artificial intelligence (AI) model.

The AI model may be obtained through training or learning. Here, "obtaining through training or learning" may be construed as obtaining a predefined task rule or an AI model that performs a needed function or purpose by training a basic AI model with multi-training data through a training algorithm.

The AI model may include a plurality of neural network layers. Each of the neural network layers may have a plurality of weight values, and a neural network calculation or operation may be performed through a calculation between a result of a calculation in a previous layer and a plurality of weight values.

The methods and apparatuses discussed herein may be implemented in visual understanding technology. Visual understanding may be a technology for recognizing an object in an equivalent way a human vision does, and may include, for example, object recognition, object tracking, image search, human recognition, scene recognition, 3D reconstruction/positioning, image enhancement, or the like.

The single-stage DNN, the feature extraction modules 411 and 1211, the multi-level feature fusion module 412, the first convolution modules 413, 611, and 1214, the second convolution modules 415 and 1217, the third convolution module 417, the image processors 900 and 1310, the mapping relationship determiners 920 and 1320, the pose determiners 930 and 1330, the image processing and mapping unit (or image processor and mapper) 1010, the camera motion determiner 1020, the corresponding relationship constructor 1030, the pose determiner 1040, the region candidate network 1212, the ROI pooling module 1213, the processors, and the memories in FIGS. 1 to 13 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with object pose estimation, comprising:
    obtaining an instance segmentation image and a normalized object coordinate space (NOCS) map by processing an input single-frame image using a deep neural network (DNN);
    generating a two-dimensional and three-dimensional (2D-3D) mapping relationship between the instance segmentation image and the NOCS map based on 2D coordinates of a pixel point in the instance segmentation image and 3D coordinates of NOCS point corresponding to the pixel point in the NOCS map; and
    determining a pose of an object instance in the single-frame image based on the 2D-3D mapping relationship.

2. The method of claim 1, further comprising:
    obtaining a pixel coordinate error map by processing the single-frame image using the DNN,
        wherein the obtaining of the 2D-3D mapping relationship comprises:
            constructing a preliminary 2D-3D mapping relationship of the object instance by obtaining a pixel point in the object instance in the single-frame image and a NOCS point of the pixel point using the instance segmentation image and the NOCS map; and
            obtaining the 2D-3D mapping relationship by removing abnormal 2D-3D mapping from the preliminary 2D-3D mapping relationship using the pixel coordinate error map.

3. The method of claim 2, wherein each error value among error values of the pixel coordinate error map represents a difference between a predicted NOCS coordinate value and a real NOCS coordinate value for each pixel point among pixel points of the single-frame image.

4. The method of claim 2, wherein the obtaining of the 2D-3D mapping relationship by removing the abnormal 2D-3D mapping from the preliminary 2D-3D mapping relationship using the pixel coordinate error map comprises:
    determining an error value greater than a preset threshold value in the pixel coordinate error map; and
    obtaining the 2D-3D mapping relationship by removing, from the preliminary 2D-3D mapping relationship, 2D-3D mapping corresponding to a NOCS point corresponding to the error value greater than the preset threshold value.

5. The method of claim 2, wherein the processing of the input single-frame image using the DNN comprises obtaining a multi-scale image feature by extracting a feature from the input single-frame image using a feature extraction module of the DNN.

6. The method of claim 5, wherein the obtaining of the NOCS map comprises:
obtaining a single-scale image feature by fusing the multi-scale image feature using a multi-level feature fusion module of the DNN; and
obtaining the NOCS map by performing a convolution on the single-scale image feature using a first convolution module of the DNN.

7. The method of claim 6, wherein the obtaining of the pixel coordinate error map by processing the input single-frame image using the DNN comprises obtaining the pixel coordinate error map by performing a convolution on the single-scale image feature using the first convolution module.

8. The method of claim 6, wherein the obtaining of the instance segmentation image comprises:
obtaining a mask feature image by performing a convolution on the single-scale image feature using a second convolution module of the DNN;
obtaining an object category image and a mask convolution weight for each of multiple scales through a convolution corresponding to each of multi-scale image features using a third convolution module of the DNN;
obtaining a multi-scale instance mask image by performing a convolution on the mask feature image and a multi-scale mask convolution weight; and
obtaining the instance segmentation image using the multi-scale instance mask image and a multi-scale object category image.

9. The method of claim 1, wherein the determining of the pose of the object instance in the input single-frame image based on the 2D-3D mapping relationship comprises:
in the presence of a depth image corresponding to the input single-frame image, determining a (three-dimensional and three-dimensional) 3D-3D mapping relationship based on the 2D-3D mapping relationship and the depth image, and determining the pose and a size of the object instance using the 3D-3D mapping relationship.

10. The method of claim 1, wherein the determining of the pose of the object instance in the input single-frame image based on the 2D-3D mapping relationship comprises:
in the absence of a depth image corresponding to the input single-frame image, determining a three-dimensional (3D) rotation transformation and a 3D translation transformation between a camera coordinate system and an object coordinate system using the 2D-3D mapping relationship, and determining the pose of the object instance in a preset size.

11. A method with object pose estimation, comprising:
obtaining an instance segmentation image and a two-dimensional and three-dimensional (2D-3D) mapping relationship of each of frame images, using a deep neural network (DNN);
calculating a camera motion parameter between two frame images among the frame images;
determining a three-dimensional and three-dimensional (3D-3D) mapping relationship of a same object instance in the two frame images based on the camera motion parameter, the instance segmentation image, and the 2D-3D mapping relationship that correspond to the two frame images based on 2D coordinates of a pixel point in the instance segmentation image and 3D coordinates of NOCS point corresponding to the pixel point in NOCS map; and
determining a pose and a size of the same object instance using the 3D-3D mapping relationship.

12. The method of claim 11, wherein the obtaining of the instance segmentation image and the 2D-3D mapping relationship of each of the frame images using the DNN comprises:
obtaining the instance segmentation image and a normalized object coordinate space (NOCS) map by processing each of the frame images using the DNN; and
obtaining the 2D-3D mapping relationship of each of the frame images based on the instance segmentation image and the NOCS map of each of the frame images.

13. The method of claim 12, further comprising:
obtaining a pixel coordinate error map by processing each of the frame images using the DNN,
wherein the obtaining of the 2D-3D mapping relationship of each of the frame images comprises:
constructing a preliminary 2D-3D mapping relationship of the same object instance by obtaining a pixel point in the same object instance in each of the frame images and a NOCS point of the pixel point using the NOCS map and the instance segmentation image; and
obtaining the 2D-3D mapping relationship by removing abnormal 2D-3D mapping from the preliminary 2D-3D mapping relationship using the pixel coordinate error map.

14. The method of claim 11, wherein the determining of the 3D-3D mapping relationship of the same object instance in the two frame images based on the camera motion parameter, the instance segmentation image, and the 2D-3D mapping relationship that correspond to the two frame images comprises:
determining a corresponding relationship between pixels in the same object instance in the two frame images based on the instance segmentation image and the 2D-3D mapping relationship;
obtaining three-dimensional (3D) coordinates by calculating a depth of a pixel point in the same object instance in a real scene, using the corresponding relationship between the pixels in the same object instance and the camera motion parameter; and
constructing the 3D-3D mapping relationship based on the 3D coordinates of the pixel point in the same object instance in the real scene and on the 2D-3D mapping relationship.

15. An apparatus with object pose estimation, comprising:
a processor configured to: generate an instance segmentation image and a normalized object coordinate space (NOCS) map by processing an input single-frame image using a deep neural network (DNN);
generate a two-dimensional and three-dimensional (2D-3D) mapping relationship between the instance segmentation image and the NOCS map based on 2D coordinates of a pixel point in the instance segmentation image and 3D coordinates of NOCS point corresponding to the pixel point in the NOCS map; and
determine a pose of an object instance in the input single-frame image based on the 2D-3D mapping relationship.

16. The apparatus of claim 15, wherein the processor is further configured to obtain a pixel coordinate error map by processing the input single-frame image using the DNN, and wherein the mapping relationship determiner is further configured to obtain the 2D-3D mapping relationship by constructing a preliminary 2D-3D mapping relationship of the object instance by obtaining a pixel point in the object instance in the input single-frame image using the instance segmentation image and the NOCS map, and by removing abnormal 2D-3D mapping from the preliminary 2D-3D mapping relationship using the pixel coordinate error map.

17. The apparatus of claim 16, wherein the processor is further configured to obtain the 2D-3D mapping relationship by determining an error value greater than a preset threshold value in the pixel coordinate error map, and by removing, from the preliminary 2D-3D mapping relationship, 2D-3D mapping corresponding to a NOCS point corresponding to the error value greater than the preset threshold value.

18. The apparatus of claim 15, wherein the pose processor is further configured to:
   in the presence of a depth image corresponding to the input single-frame image, determine a three-dimensional and three-dimensional (3D-3D) mapping relationship based on the 2D-3D mapping relationship and the depth image, and determine a pose and a size of the object instance using the 3D-3D mapping relationship; and
   in the absence of the depth image corresponding to the input single-frame image, determine a 3D rotation transformation and a 3D translation transformation between a camera coordinate system and an object coordinate system using the 2D-3D mapping relationship, and determine a pose of the object instance in a preset size.

19. An apparatus with object pose estimation, comprising:
a processor configured to: generate an instance segmentation image and a two-dimensional and three-dimensional (2D-3D) mapping relationship of each of frame images, using a deep neural network (DNN);
   determine a camera motion parameter between two frame images among the frame images;
   determine a three-dimensional and three-dimensional (3D-3D) mapping relationship of a same object instance in the two frame images based on the camera motion parameter, the instance segmentation image, and the 2D-3D mapping relationship that correspond to the two frame images based on 2D coordinates of a pixel point in the instance segmentation image and 3D coordinates of NOCS point corresponding to the pixel point in NOCS map; and
   determine a pose and a size of the same object instance using the 3D-3D mapping relationship.

20. The apparatus of claim 19, wherein the processor is further configured to:
   determine a corresponding relationship between pixels in the same object instance in the two frame images based on the instance segmentation image and the 2D-3D mapping relationship;
   obtain three-dimensional (3D) coordinates by calculating a depth of a pixel point in the same object instance in a real scene, using the corresponding relationship between the pixels in the same object instance and the camera motion parameter; and
   construct the 3D-3D mapping relationship based on the 3D coordinates of the pixel point in the same object instance in the real scene and on the 2D-3D mapping relationship.

* * * * *